US012400535B2

(12) United States Patent
Frederick et al.

(10) Patent No.: US 12,400,535 B2
(45) **Date of Patent: *Aug. 26, 2025**

(54) DEVICE, SYSTEM, AND METHOD FOR ASSESSING WORKER RISK

(71) Applicant: MAKUSAFE CORP., West Des Moines, IA (US)

(72) Inventors: Mark Frederick, Cumming, IA (US); Gabriel Glynn, Ankeny, IA (US); Matthew McMullen, Omaha, NE (US); Chris Wagner, Alexandria, MN (US)

(73) Assignee: MAKUSAFE CORP., West Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,958

(22) Filed: Jan. 4, 2024

(65) Prior Publication Data

US 2024/0135798 A1 Apr. 25, 2024

Related U.S. Application Data

(63) Continuation-in-part of application No. 17/977,707, filed on Oct. 31, 2022, now Pat. No. 11,990,020, (Continued)

(51) Int. Cl.
*G08B 25/01* (2006.01)
*G08B 21/04* (2006.01)
*G08B 21/14* (2006.01)

(52) U.S. Cl.
CPC ......... *G08B 21/14* (2013.01); *G08B 21/0446* (2013.01); *G08B 21/0453* (2013.01); *G08B 21/0469* (2013.01); *G08B 25/016* (2013.01)

(58) Field of Classification Search
CPC ............... G08B 21/14; G08B 21/0446; G08B 21/0469; G08B 25/016; G08B 21/0453
See application file for complete search history.

(56) References Cited

U.S. PATENT DOCUMENTS

| | | | |
|---|---|---|---|
| 7,705,723 | B2 | 4/2010 | Kahn |
| D654,462 | S | 2/2012 | Nara |

(Continued)

FOREIGN PATENT DOCUMENTS

| | | | |
|---|---|---|---|
| KR | 102106545 | B1 | 9/2020 |
| WO | 2022013738 | A1 | 1/2022 |

OTHER PUBLICATIONS

S. Banerjee M. Hempel and H. Sharif "A review of workspace challenges and wearable solutions in railroads and construction" 2017 13th International Wireless Communications and Mobile Computing Conference (IWCMC) Valencia Spain 2017 pp. 91-96 doi: B13.

*Primary Examiner* — John A Tweel, Jr.
(74) *Attorney, Agent, or Firm* — Christopher A. Proskey; BrownWinick Law Firm

(57) ABSTRACT

A system and method for evaluating safety risk of workers is presented. The system includes wearable devices configured to be attached to or carried by workers during a work shift and a monitoring system. The wearable device includes sensors configured to sample sensor data indicative of working conditions and work performed by workers. The wearable device is configured to record an audio recording and communicate a set of data including the audio recording and/or sensor data to the monitoring system in response to an event trigger being engaged. In one or more arrangements, the monitoring system is configured to facilitate creation of a workflow for performance of a task described in the audio recording in response to receiving the set of data.

29 Claims, 8 Drawing Sheets

Related U.S. Application Data which is a continuation of application No. 17/313,514, filed on May 6, 2021, now Pat. No. 11,527,142, which is a continuation-in-part of application No. 16/689,303, filed on Nov. 20, 2019, now Pat. No. 11,030,875, which is a continuation of application No. 16/124,287, filed on Sep. 7, 2018, now Pat. No. 10,522,024, which is a continuation of application No. 15/614,835, filed on Jun. 6, 2017, now Pat. No. 10,096,230.

(60) Provisional application No. 63/437,274, filed on Jan. 5, 2023, provisional application No. 63/024,545, filed on May 14, 2020, provisional application No. 62/346,231, filed on Jun. 6, 2016.

(56) References Cited

U.S. PATENT DOCUMENTS

| | | | | |
|---|---|---|---|---|
| 8,140,131 | B1 | 3/2012 | Green | |
| D675,946 | S | 2/2013 | Chan | |
| D680,990 | S | 4/2013 | Hashimoto | |
| D687,004 | S | 7/2013 | Behling | |
| 8,698,100 | B2 | 4/2014 | Schumacher | |
| D709,846 | S | 7/2014 | Oswaks | |
| 8,795,168 | B2 | 8/2014 | Goh | |
| D783,021 | S | 4/2017 | Peel | |
| 9,659,484 | B1 | 5/2017 | Mehta | |
| 9,721,456 | B2 | 8/2017 | Thurlow | |
| D799,353 | S | 10/2017 | Qu | |
| 9,792,798 | B2 | 10/2017 | Jobin | |
| D823,311 | S | 7/2018 | Oberpriller | |
| 10,096,230 | B2 | 10/2018 | Glynn | |
| 10,395,160 | B2 | 8/2019 | Vera Manero | |
| 10,454,971 | B2 | 10/2019 | Chalmers | |
| 10,460,592 | B2 | 10/2019 | Thurlow | |
| 10,522,024 | B2 | 12/2019 | Glynn | |
| D882,541 | S | 4/2020 | Xu | |
| 10,783,989 | B2 | 9/2020 | Bangera | |
| 10,806,404 | B2 | 10/2020 | Soto | |
| 10,909,835 | B1 | 2/2021 | Singh | |
| 11,030,875 | B2 | 6/2021 | Glynn | |
| 11,113,942 | B1 | 9/2021 | Wade | |
| 11,170,894 | B1 | 11/2021 | Kocher | |
| D937,828 | S | 12/2021 | Glynn | |
| D938,415 | S | 12/2021 | Glynn | |
| 11,302,020 | B2 | 4/2022 | Matsuo | |
| 11,527,142 | B2 | 12/2022 | Glynn | |
| 11,743,958 | B2 * | 8/2023 | Raj | G06F 3/165 370/328 |
| 11,990,020 | B2 * | 5/2024 | Glynn | G08B 21/043 |
| 2005/0073426 | A1 | 4/2005 | Hines | |
| 2006/0036619 | A1 | 2/2006 | Fuerst | |
| 2007/0106775 | A1 | 5/2007 | Wong | |
| 2007/0213877 | A1 | 9/2007 | Hart | |
| 2007/0285258 | A1 | 12/2007 | Hartman | |
| 2008/0139952 | A1 | 6/2008 | Kuroda | |
| 2008/0180243 | A1 | 7/2008 | Aaron | |
| 2009/0047643 | A1 | 2/2009 | Isaac | |
| 2009/0088689 | A1 | 4/2009 | Carter | |
| 2009/0121931 | A1 | 5/2009 | Katz | |
| 2010/0099461 | A1 | 4/2010 | Rahfaldt | |
| 2010/0241465 | A1 | 9/2010 | Amigo | |
| 2010/0298661 | A1 | 11/2010 | McCombie et al. | |
| 2012/0319847 | A1 | 12/2012 | Heller | |
| 2013/0103428 | A1 | 4/2013 | Molinsky | |
| 2013/0116591 | A1 | 5/2013 | Heller | |
| 2013/0271264 | A1 | 10/2013 | Page | |
| 2014/0266793 | A1 | 9/2014 | Velado | |
| 2017/0024531 | A1 | 1/2017 | Malaviya | |
| 2017/0127257 | A1 | 5/2017 | Saxena | |
| 2017/0140637 | A1 | 5/2017 | Thurlow | |
| 2017/0330446 | A1 | 11/2017 | Thurlow | |
| 2017/0352242 | A1 | 12/2017 | Glynn | |
| 2018/0052970 | A1 | 2/2018 | Boss | |
| 2018/0069866 | A1 | 3/2018 | Chalmers | |
| 2018/0121861 | A1 | 5/2018 | Morgenthau | |
| 2019/0114573 | A1 | 4/2019 | Moore | |
| 2020/0202281 | A1 | 6/2020 | Barak | |
| 2020/0297250 | A1 | 9/2020 | Elhawary | |
| 2021/0264764 | A1 | 8/2021 | Glynn | |
| 2021/0295460 | A1 | 9/2021 | Tamazato | |
| 2021/0383261 | A1 | 12/2021 | Hanna | |
| 2022/0147889 | A1 | 5/2022 | Frederick | |
| 2023/0112656 | A1 | 4/2023 | Frederick | |
| 2024/0232766 | A1 | 7/2024 | Frederick | |

* cited by examiner

DEVICE, SYSTEM, AND METHOD FOR ASSESSING WORKER RISK

CROSS REFERENCE TO RELATED APPLICATIONS

The present application claims priority to U.S. Provisional Application No. 63/437,274, filed on Jan. 5, 2023 and titled DEVICE, SYSTEM, AND METHOD FOR ASSESSING WORKER RISK, which is hereby incorporated by reference herein in its entirety, including any figures, tables, or drawings or other information.

The present application is a continuation-in-part of U.S. Utility application Ser. No. 17/977,707 filed on Oct. 31, 2022 and titled DEVICE, SYSTEM AND METHOD FOR HEALTH AND SAFETY MONITORING, which is a continuation of U.S. Utility application Ser. No. 17/313,514 filed on May 6, 2021 and titled DEVICE, SYSTEM AND METHOD FOR HEALTH AND SAFETY MONITORING, which is a continuation-in-part of U.S. Utility application Ser. No. 16/689,303 filed on Nov. 20, 2019 and titled SAFETY DEVICE, SYSTEM AND METHOD OF USE, which is a continuation of U.S. Utility application Ser. No. 16/124,287 filed on Sep. 7, 2018 and titled SAFETY DEVICE, SYSTEM AND METHOD OF USE, which is a continuation of U.S. Utility application Ser. No. 15/614,835 filed on Jun. 6, 2017 and titled SAFETY DEVICE, SYSTEM AND METHOD OF USE, and which claims priority to U.S. Provisional Application No. 62/346,231 filed on Jun. 6, 2016 and titled SAFETY DEVICE, SYSTEM AND METHOD OF USE, each of which is hereby incorporated by reference herein in its entirety, including any figures, tables, or drawings or other information. The U.S. Utility application Ser. No. 17/313,514 also claims priority to U.S. Provisional Application No. 63/024,545 filed on May 14, 2020 and titled DEVICE, SYSTEM AND METHOD FOR HEALTH AND SAFETY MONITORING, which is hereby incorporated by reference herein in its entirety, including any figures, tables, or drawings or other information.

FIELD OF THE DISCLOSURE

This disclosure generally relates to monitoring systems. More specifically and without limitation, this disclosure relates to a monitoring system utilizing wearable devices to gather information indicative of worker actions and/or work conditions.

OVERVIEW OF THE DISCLOSURE

Injuries at work are tremendously costly for both the corporation as well as the injured worker. As an example, it is estimated that yearly workers' compensation claims exceed 100 billion dollars, with the average claim in the United State amounting to over 100,000 dollars.

Most, if not all of these work-related injuries are avoidable. In view of the personal cost to the injured worker and the financial cost to the employer, a great amount of energy and effort has been placed on avoiding workplace injuries. Many employers have implemented various systems to avoid accidents ranging from common sense solutions to sophisticated systems, from establishing safety teams and safety managers to hiring third-party safety auditors, and everything in-between. However, despite these many efforts, avoidable injuries continue to occur at an alarming pace.

To better inform and address workplace injuries, some current systems utilize wearable devices to gather data to evaluate movement, physical exertion, biometric data, environmental, or other data relevant to health and/or safety of workers. It is desired to be able to receive data from wearable devices to facilitate monitoring of workers throughout a work shift and facilitate early intervention when safety risks are detected and/or early response to accidents. It is also desirable to for workers to identify problems and/or potential issues that are observed during a work shift so they may be proactively addressed. However, workers may forget about problems and potential issues they observed if reporting is delayed.

Therefore, there is a need in the art to provide a device, system, and method of use for collecting, reporting and analyzing information relating to workplace incidents, problems, potential concerns, work performed by workers and/or workplace conditions to better assess risk posed to workers during a work shift.

Thus, it is a primary object of the disclosure to provide a wearable device, system, and method of use that improves upon the state of the art.

Another object of the disclosure is to provide a wearable device, system, and method of use that collects information about the work performed by workers and workplace conditions.

Yet another object of the disclosure is to provide a wearable device, system, and method of use that records audio in response to an event trigger and communicates the audio recording to a monitoring system.

Another object of the disclosure is to provide a wearable device, system, and method of use that records audio in response to an event trigger and communicates the voice memo containing the audio recording and sensor data to a monitoring system.

Yet another object of the disclosure is to provide a wearable device, system, and method of use that uses voice memos to initiate workflows managed by a monitoring system.

Another object of the disclosure is to provide a wearable device, system, and method of use that uses voice memos to initiate one or more actions by a monitoring system.

Yet another object of the disclosure is to provide a wearable device, system, and method of use that uses voice memos to permit workers to report incidents.

Another object of the disclosure is to provide a wearable device, system, and method of use that uses voice memos to permit workers to send communications.

Yet another object of the disclosure is to provide a wearable device, system, and method of use that uses voice memos to permit workers to submit suggestions.

Another object of the disclosure is to provide a wearable device, system, and method of use that provides a user interface for users to create, manage, and process workflow tasks.

Yet another object of the disclosure is to provide a wearable device, system, and method of use that aggregates a great amount of information about the work performed by workers and workplace conditions and facilitate data analytics.

Another object of the disclosure is to provide a wearable device, system, and method of use that eliminates bias in the collection of information about the work performed by workers and workplace conditions.

Yet another object of the disclosure is to provide a wearable device, system, and method of use that eliminates the inconsistency in reporting information about the work performed by workers and workplace conditions.

Another object of the disclosure is to provide a wearable device, system, and method of use that utilizes collected information to assess safety risks faced during a work shift.

Yet another object of the disclosure is to provide a wearable device, system, and method of use that is cost effective.

Another object of the disclosure is to provide a wearable device, system, and method of use that is safe to use.

Yet another object of the disclosure is to provide a wearable device, system, and method of use that is easy to use.

Another object of the disclosure is to provide a wearable device, system, and method of use that is efficient to use.

Yet another object of the disclosure is to provide a wearable device, system, and method of use that is durable.

Another object of the disclosure is to provide a wearable device, system, and method of use that is robust.

Yet another object of the disclosure is to provide a wearable device, system, and method of use that can be used with a wide variety of manufacturing facilities.

Another object of the disclosure is to provide a wearable device, system, and method of use that is high quality.

Yet another object of the disclosure is to provide a wearable device, system, and method of use that has a long useful life.

Another object of the disclosure is to provide a wearable device, system, and method of use that can be used with a wide variety of occupations.

Yet another object of the disclosure is to provide a wearable device, system, and method of use that provides high quality data.

Another object of the disclosure is to provide a wearable device, system, and method of use that provides data and information that can be relied upon.

These and countless other objects, features, or advantages of the present disclosure will become apparent from the specification, figures, and claims.

SUMMARY

In one or more arrangements, a system and method are presented for monitoring worker activity and/or working conditions and/or for reporting issues and/or problems observed by workers. In one or more arrangements, the system includes a wearable device and a monitoring system. The wearable device is configured to be worn by a worker during a work shift. The wearable device is configured to record an audio recording and communicate a set of data including the audio recording to the monitoring system in response to an event trigger being engaged. In one or more arrangements, the monitoring system is configured to facilitate creation of a workflow for performance of a task described in the audio recording in response to receiving the set of data. In one or more arrangements, the monitoring system is configured to provide user interfaces to facilitate creation, management, and performance of a task specified for the workflow Additionally or alternatively, in one or more arrangements, the monitoring system is configured to generate a report for an incident or safety issue described in the audio recording in response to receiving the set of data. Additionally or alternatively, in one or more arrangements, the monitoring system is configured to generate and submit a suggestion described in the audio recording for consideration by management in response to receiving the set of data. Additionally or alternatively, in one or more arrangements, the monitoring system is configured to communicate a message described in the audio recording in response to receiving the set of data.

wearable devices configured to communicate a voice memo containing the audio recording and sensor data to a monitoring system to indicate a workflow.

Figure 5:
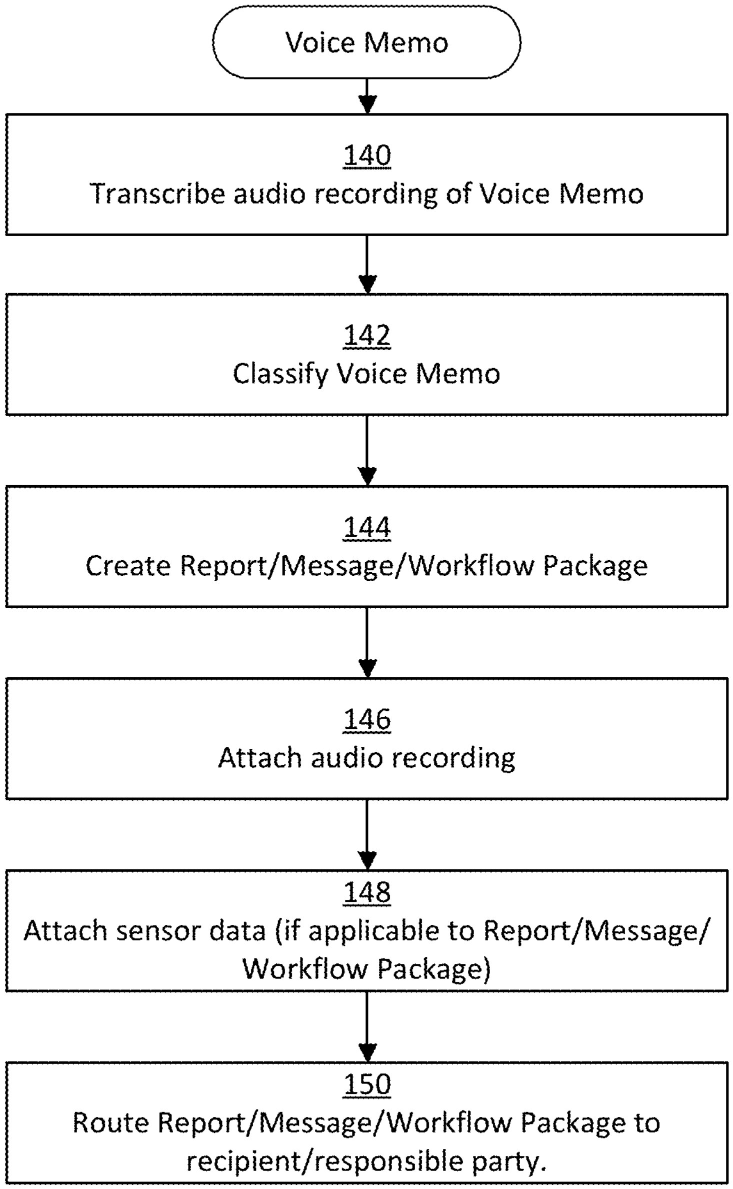

FIG. 5 shows a flowchart of an example process performed by monitoring system for processing a voice memo received from a wearable device, in accordance with one or more arrangements.

Figure 6:
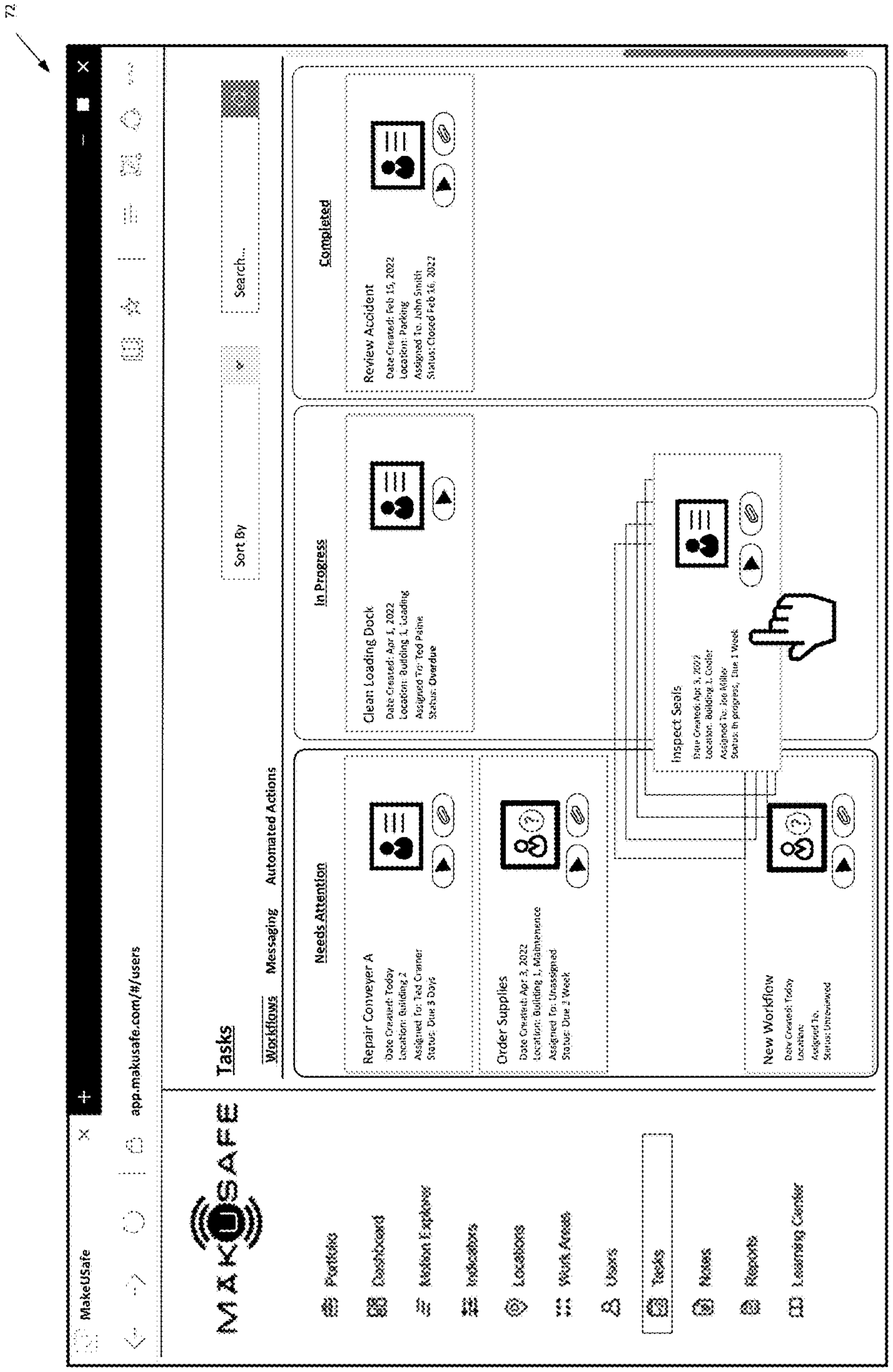

FIG. 6 shows a screenshot of an example user interface for to facilitate creation, review, managing, and/or otherwise processing of workflows, in accordance with one or more arrangements; the screenshot showing an example dashboard style user interface to facilitate creation, review, and processing of pending workflows.

Figure 7:
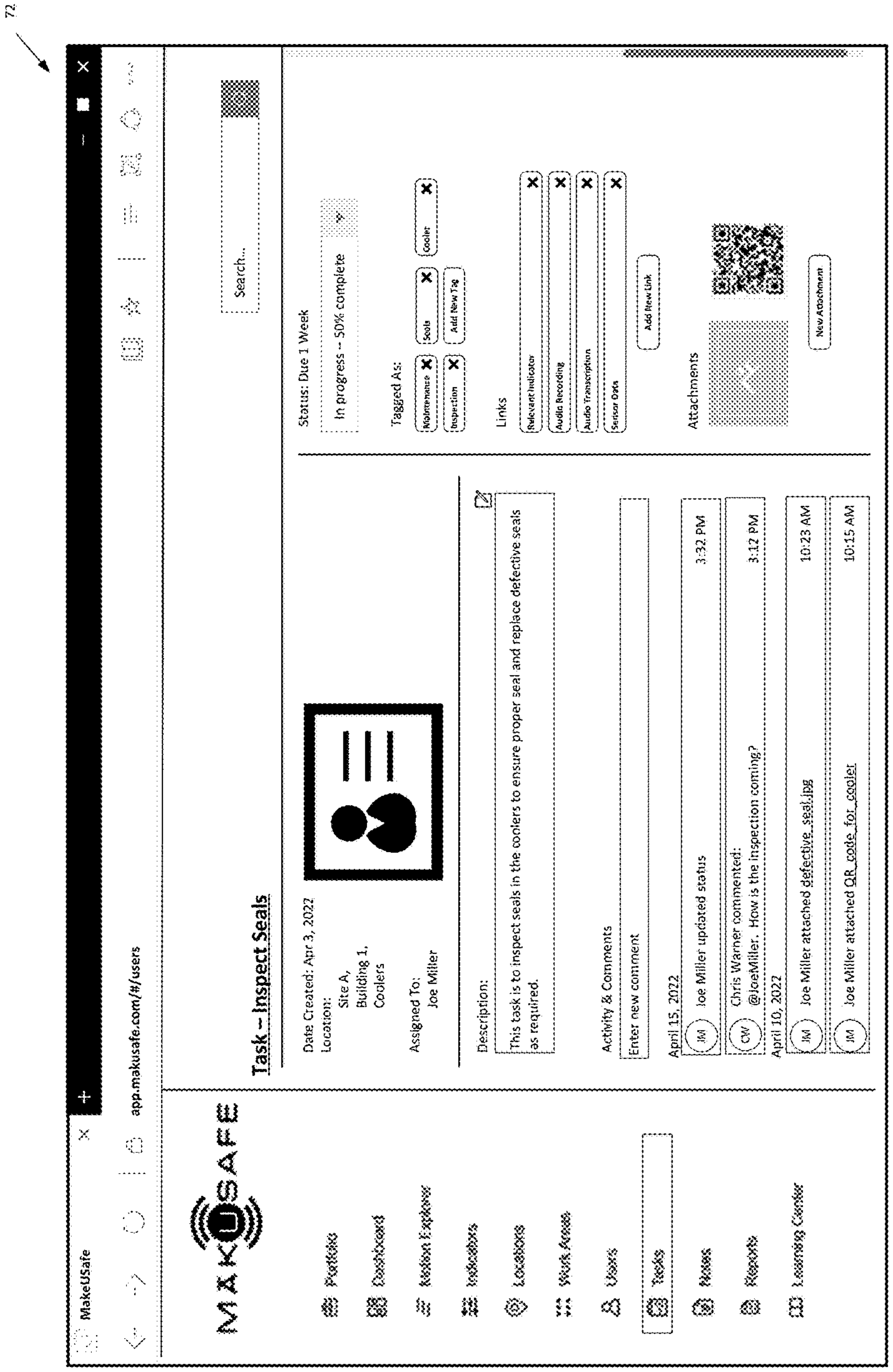

FIG. 7 shows a screenshot of an example user interface for to facilitate creation, review, managing, and/or otherwise processing of workflows, in accordance with one or more arrangements; the screenshot showing an example user interface to facilitate creation, review, and editing of a selected workflows.

Figure 8:
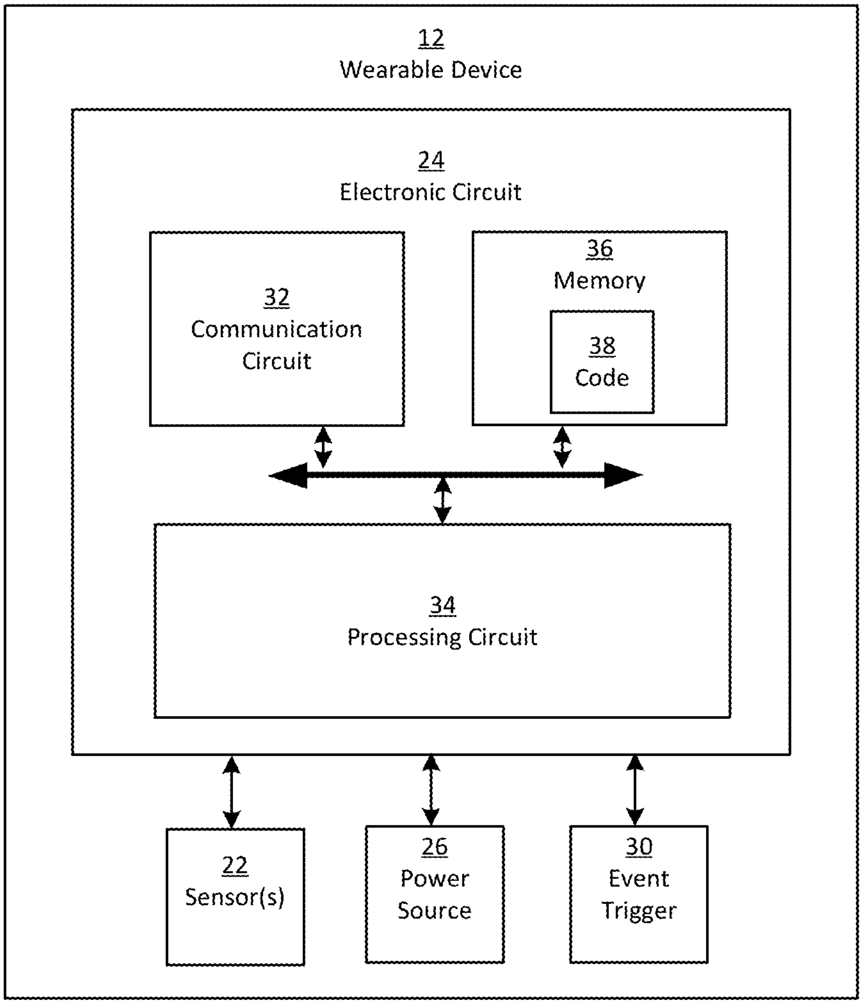

FIG. 8 shows a diagram of an example wearable device for collection of sensor data and communication of voice memos containing an audio recording and the sensor data to a monitoring system, in accordance with one or more arrangements.

DETAILED DESCRIPTION

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously introduced and not, while definite articles like "the" refer to a same previously introduced term; as such, it is understood that "a" or "an" modify items that are permitted to be previously introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of gathering information for assessment of physicality and safety risk of workers. However, the embodiments are not so limited. It is appreciated that the embodiments may be adapted for use in other applications which may be improved by the disclosed structures, arrangements and/or methods. The system is merely shown and described as being used in the context of gathering information for assessment of physicality and worker risk for ease of description and as one of countless examples.

System 10:

With reference to the figures, a system for collection of data indicative of worker activity, and/or health and safety risks 10 is presented (system 10). In one or more arrangements, system 10 includes a plurality of wearable devices 12 and a monitoring system 14 among other components.

Wearable Devices 12:

Wearable devices 12 are formed of any suitable size, shape, and design and are configured to record motion and/or other data indicative of work performed by workers and/or safety risks encountered by workers during a work shift, such as environmental conditions as well as near misses. In one or more arrangements, recorded information may include, for example, motion of workers 16 (e.g., accelerometer and/or gyroscopic data), location of workers 16 during a work shift, proximity to high risk machinery, air quality, sound levels, data indicative of physicality of tasks performed by workers such as heart rate, temperature, perspiration level, number of steps, distance traveled, and/or other data acquired by sensors of wearable devices 12.

In one or more arrangements, system 10 may include wearable devices 12, charging base 18 and/or other components implemented as described in U.S. patent application Ser. No. 17/518,644 filed Nov. 4, 2021 and titled DEVICE, SYSTEM, AND METHOD FOR ASSESSING WORKER RISK; U.S. Pub. No. 2021/0264764 filed May 6, 2021 and titled DEVICE, SYSTEM, AND METHOD FOR HEALTH AND SAFETY MONITORING; U.S. Pat. No. 11,030,875, filed on Nov. 20, 2019 and titled SAFETY DEVICE, SYSTEM, AND METHOD OF USE; U.S. Pat. No. 10,522,024 filed on Sep. 7, 2018 and titled SAFETY DEVICE, SYSTEM, AND METHOD OF USE; and U.S. Pat. No. 10,096,230 filed on Jun. 6, 2017 and titled SAFETY DEVICE, SYSTEM, AND METHOD OF USE, each of which is hereby incorporated by reference herein in its entirety, including any figures, tables, or drawings or other information.

However, the embodiments are not so limited. Rather, it is contemplated that wearable devices 12 may be implemented using various other devices and/or arrangements configured to acquire sensor data and communicate recorded sensor data to monitoring system 14. In the arrangement shown, as one example, wearable devices 12 each include one or more sensors 22, an electronic circuit 24, and a power source 26 among other components.

Sensors 22:

Sensors 22 are formed of any suitable size, shape, and design and are configured to record data relating to worker activity, and/or health and safety risks encountered by worker 16 while working. In one or more arrangements, wearable device 12 includes a plurality of sensors 22.

In one or more arrangements, wearable device 12 includes an accelerometer 22A. Accelerometer 22A is formed of any suitable size, shape, and design and is configured to detect acceleration and/or movement of the wearable device 12, such as when a worker 16 trips on something on the floor and almost falls, or when a worker 16 falls off of a ladder, is hit by a fork truck, or has another traumatic event. Accelerometer 22A may be formed of any acceleration detecting device such as a one axis accelerometer, a two-axis accelerometer, a three axis accelerometer or the like. Accelerometer 22A also allows for the detection of changes in acceleration, detection of changes in direction as well as elevated levels of acceleration.

In an alternative arrangement, or in addition to an accelerometer 22A, a gyroscope or gyro-sensor may be used to provide acceleration and/or movement information. Any form of a gyro is hereby contemplated for use, however, in one or more arrangements a three-axis MEMS-based gyroscope, such as that used in many portable electronic devices such as tablets, smartphones, and smartwatches are contemplated for use. These devices provide 3-axis acceleration sensing ability for X, Y, and Z movement, and gyroscopes for measuring the extent and rate of rotation in space (roll, pitch, and yaw).

In another arrangement, and/or in addition to an accelerometer 22A, a magnetometer may be used to provide acceleration and/or movement information. Any form of a magnetometer that senses information based on magnetic fields is hereby contemplated for use. In one or more arrangements, a magnetometer is used to provide absolute angular measurements relative to the Earth's magnetic field. In one or more arrangements, an accelerometer, gyro and/or magnetometer are incorporated into a single component or a group of components that work in corresponding relation to one another to provide up to nine axes of sensing in a single integrated circuit providing inexpensive and widely available motion sensing.

In one or more arrangements, wearable device 12 includes a temperature sensor 22B. Temperature sensor 22B is formed of any suitable size, shape, and design and is configured to detect the temperature of the environment surrounding the worker 16. The same and/or an additional temperature sensor 22B may be configured to detect the temperature of the worker 16 themselves. In one or more arrangements, temperature sensor 22B is a thermometer. Temperature sensor 22B allows for the detection of high or low temperatures as well as abrupt changes in temperature. Temperature sensor 22B also allows for the detection of when a temperature threshold is approached or exceeded. In one or more arrangements, wearable device 12 includes a humidity sensor 22C. Humidity sensor 22C is formed of any suitable size, shape, and design and is configured to detect the humidity of the environment surrounding the worker 16. The same and/or an additional humidity sensor 22C may be configured to detect the humidity level, moisture level or perspiration level of the worker 16 themselves. Humidity sensor 22C allows for the detection of high or low levels of humidity as well as abrupt changes in humidity. Humidity sensor 22C also allows for the detection of when a humidity threshold is approached or exceeded. In one or more arrangements, wearable device 12 includes a light sensor 22D. Light sensor 22D is formed of any suitable size, shape, and design and is configured to detect the light levels of the environment surrounding the worker 16. Light sensor 22D allows for the detection of high or low levels of light as well as abrupt changes in light levels. Light sensor 22D also allows for the detection of when a light threshold is approached or exceeded. In one or more arrangements, light sensor 22D is operably connected to and/or accessible by a light pipe (not shown). A light pipe is any device that facilitates the collection and transmission of light from the environment surrounding the worker 16. In one or more arrangements, the light pipe is a clear, transparent, or translucent material that extends from the exterior of the wearable device 12 to the light sensor 22D and therefore covers and protects light sensor 22D while enabling the sensing of light conditions.

In one or more arrangements, wearable device 12 includes an air quality sensor 22E. Air quality sensor 22E is formed of any suitable size, shape, and design and is configured to detect the air quality of the environment surrounding the worker 16, the particulate matter in the air of the environment surrounding the worker 16, the contaminant levels in the air of the environment surrounding the worker 16, or any particular contaminant level in the air surrounding the worker 16 (such as ammonia, chlorine, or any other chemical, compound or contaminant). Air quality sensor 22E allows for the detection of high contaminant levels in the air as well as abrupt changes in air quality. Air quality sensor 22E also allows for the detection of when an air quality threshold is approached or exceeded.

In one or more arrangements, air quality sensor 22E is a total volatile organic compound sensor, also known as a TVOC sensor. Volatile organic compounds (or VOCs) are organic chemicals that have a high vapor pressure at ordinary room temperature. VOCs are numerous, varied, and ubiquitous. They include both human-made and naturally occurring chemical compounds. Most scents or odors are of VOCs. In this arrangement, air quality sensor 22 is configured to detect VOCs. Also, in one or more arrangements, air quality sensor 22E is accessible through one or more openings in wearable device 12 that provide unfettered access and airflow for sensing by air quality sensor 22E.

In one or more arrangements, wearable device 12 includes a carbon monoxide (CO) sensor 22F. CO sensor 22F is formed of any suitable size, shape, and design and is configured to detect CO levels of the environment surrounding the worker 16. CO sensor 22F allows for the detection of high CO levels in the air as well as abrupt changes in CO levels. CO sensor 22F also allows for the detection of when a CO threshold is approached or exceeded. Of course, sensor 22F, or additional sensors 22, may be used to sense other gasses in the air around the worker 16, such as carbon dioxide, ozone, or any other gas or other content of the air around the worker 16. Also, in one or more arrangements, sensor 22F is accessible through one or more openings in wearable device 12 that provide unfettered access and airflow for sensing by sensor 22F.

In one or more arrangements, wearable device 12 includes a position sensor 22G. Position sensor 22G is formed of any suitable size, shape, and design and is configured to detect the position of the worker 16 within the manufacturing facility. Notably, the term manufacturing facility is to be construed in a broad manner and may include being within one or a plurality of buildings. However, the manufacturing facility may include being outside and unconstrained by the boundaries of a building or any particular grounds. Position sensor 22G allows for the detection of movement of the worker 16 within the manufacturing facility, the speed of movement of the worker 16 within the manufacturing facility, the tracking of the position of the worker 16 within the manufacturing facility, among any other speed, location, direction, inertia, acceleration or position information. This position information can be aggregated over the course of the worker's shift to determine the amount of distance traveled by the worker 16, the average speed, the mean speed, the highest speed, or any other information. In addition, this position information can be aggregated to determine the areas where the worker 16 concentrated their time. In addition, this position information can be correlated with the information detected by the other sensors to determine the concentration of certain environmental factors in different areas of the manufacturing facility. Position sensor 22G may be a GPS device, a wireless device (e.g., Wi-Fi and/or RFID) configured to detect presence of nearby wearable devices, a wireless device that utilizes trilateration from known points, or any other device that detects the position of wearable device 12 and the worker 16.

Wearable device 12 may also include any other sensors 22. For example, in one or more arrangements, wearable device 12 includes one or more sensor 22 that tracks biometric data of the worker 16 including but not limited to, for example, heart rate, blood pressure, blood oxygen levels, blood alcohol levels, blood glucose sensor, respiratory rate, galvanic skin response, bioelectrical impedance, brain waves, and/or combinations thereof.

In one or more arrangements, wearable device 12 includes a sound sensor 22H. Sound sensor 22H is formed of any suitable size, shape, and design and is configured to detect the volume level and/or frequency of sound surrounding the worker 16. In one or more arrangements, sound sensor 22H is a microphone that is accessible through one or more openings in wearable device 12 that provide unfettered access for the sound to reach the microphone. Sound sensor 22H allows for the detection of elevated sounds, abrupt spikes in sounds, loud noises, irritating or distracting frequencies or the like. Sound sensor 22H also allows for the detection of when a volume threshold is approached or exceeded.

During operation, sensors 22 detect environmental conditions, such as sound, temperature, humidity, light, air quality, CO levels, TVOC levels, particulate levels, position and acceleration information, direction information, speed information and the like respectively.

Electronic Circuit 24:

Electronic circuit 24 is formed of any suitable size, shape, design, technology, and in any arrangement and is configured to facilitate retrieval, processing, and/or communication of data from sensor(s) 22 of wearable device 12 to monitoring system 14. In the arrangement shown, as one example, electronic circuit 24 includes a communication circuit 32, a processing circuit 34, and a memory 36 having software code 38 or instructions that facilitates the operation of wearable device 12.

In one or more arrangements, electronic circuit 24 includes a communication circuit 32. Communication circuit 32 is formed of any suitable size, shape, design, technology, and in any arrangement and is configured to facilitate communication with monitoring system 14, In one or more arrangements, as one example, communication circuit 32 includes a transmitter (for one-way communication) or transceiver (for two-way communication). In some various arrangements, communication circuit 32 may be configured to communicate with monitoring system 14 and/or various components of system 10 using various wired and/or wireless communication technologies and protocols over various networks and/or mediums including but not limited to, for example, IsoBUS, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, 4G, 5G, FM/VHF/UHF networks, and/or any other communication protocol, technology or network.

In some various arrangements, electronic circuit 24 and/or communication circuit 32 may be configured to communicate data from sensors 22 to monitoring system 14 (or other device) continuously, periodically, according to a schedule, when prompted by monitoring system 14 (or other device), when wearable device is checked in and connected to charging base 18, and/or in response to any other stimuli, command, or event.

Processing circuit 34 may be any computing device that receives and processes information and outputs commands, for example, according to software code 38 stored in memory 36. For instance, in some various arrangements, processing circuit 34 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 36. Memory 36 may be any form of information storage such as flash memory, ram memory, dram memory, a hard drive, or any other form of memory.

In one or more arrangements, processing circuit 34 and memory 36 may be formed of a single combined unit. Alternatively, processing circuit 34 and memory 36 may be formed of separate but electrically connected components. Alternatively, processing circuit 34 and memory 36 may each be formed of multiple separate but communicatively connected components. Software code 38 is any form of instructions or rules that direct how processing circuit 34 is to receive, interpret and respond to information to operate as described herein, Software code 38 or instructions are stored in memory 36 and accessible to processing circuit 34.

Power Source 26:

In the arrangement shown, as one example, wearable device 12 includes a power source 26. Power source 26 is formed of any suitable size, shape, design, technology, and in any arrangement or configuration and is configured to provide power to wearable device 12 so as to facilitate the operation of the electronic circuit 24, sensors 22, and/or other electrical components of the wearable device 12. In the arrangement shown, as one example, power source 26 is formed of one or more batteries, which may or may not be rechargeable. Additionally or alternatively, in one or more arrangements, power source 26 may include a solar cell or solar panel that may power or recharge wearable device 12. Additionally or alternatively, in one or more arrangements, power source 26 may be line-power that is power that is delivered from an external power source into the wearable device 12 through a wired connection, Additionally or alternatively, in one or more arrangements, power source 26 may be a wireless power delivery system configured to power or recharge wearable device 12. Any other form of a power source 26 is hereby contemplated for use, Attachment Member 28:

In one or more arrangements, wearable device 12 is configured to be worn by a worker 16 and in this way, wearable device 12 is considered to be a wearable device 12. To facilitate being worn by a worker 16 while working, wearable device 12 includes an attachment member 28 connected to or formed into wearable device 12. In some various arrangements, wearable device 12 may utilize various different methods and/or means to attach with a worker 16 including but not limited to, for example, a band, strap, belt, elastic strap or the like, that is attachable to a worker's arm wrist, waist or other part of the body or clothing worn by the worker 16. In one or more arrangements, it is desirable to attach the wearable device 12 to the worker's non-dominant arm while working. Alternatively, attachment member 28 is formed of any other device that connects two components together such as a snap-fit member, a clip, hook-and-loop arrangement, a button, a snap, a zipper-mechanism, a zip-tie member, or the like, just to name a few. As another arrangement, wearable device 12 can be attached to or formed as part of a piece of clothing or equipment, such as a safety vest, a helmet or the like. In one or more arrangements, as is further described herein, wearable device 12 is held within a holster having an attachment member in a removable manner, as is further described herein.

Event Trigger 30:

Wearable device 12 includes an event trigger 30. Event trigger 30 is formed of any suitable size, shape and design and is configured to allow a worker 16 to indicate that a notable event just occurred, such as an accident that almost occurred (also known as a near miss), such as when the worker 16 trips and almost falls, when the worker 16 is almost struck by a forklift, when products almost fall on the worker 16, when the worker 16 is almost injured by a tool, or the like near misses.

Also, workers 16 are encouraged to use event trigger 30 when a notable event occurs. This may be any information that the worker 16 believes would be helpful for the safety manager to know about or others in the management of the manufacturing facility. This may include a suggestion as to how to improve the manufacturing facility, problems associated with the layout of the manufacturing facility, the worker 16 noticing that equipment is wearing and likely to fail in the near future, that ear plugs, safety glasses or other protective equipment is failing, that a door fails to lock, that another employee is behaving strangely or taking unnecessary risks, or practically any other information. It has been tested that providing the worker 16 with the instantaneous ability to record suggestions or information at the moment the information dawns on the worker 16, reduces the barriers to providing this information and as such, this information is more-readily provided as it is very easy to provide. In addition, because the information is provided contemporaneous with the worker 16 experiencing the notable event, it has been found that the information is provided in a thorough, unbiased, honest, and straight forward manner. Or said, another way, when a worker 16 waits to report improvements or issues at the end of the shift, the worker 16 is likely to be uninclined to go through the reporting process, they are likely to forget salient details, or their memory of events could fade. In contrast, by providing an easy and contemporaneous recordation of the notable event at or just after the time the event occurs, the information provided tends to be pure and uncorrupted. Due to the ease of simply pressing the event trigger 30 the worker 16 is likely to report the information. More accurate reporting and more frequent reporting allows a safety manager or management in general to be more aware of the issues in the manufacturing facility and able to continuously improve the manufacturing facility. In addition, the timeliness of this information cannot be matched as it is transmitted to the safety manager and/or database 60 as soon as it is recorded and as soon as the wearable device 12 establishes connectivity with database 60 and/or charging base 18 or another wireless communication intermediary, such as a repeater.

In one or more arrangements, event trigger 30 is a button, switch or other device placed on or formed in wearable device 12 that allows the worker 16 to indicate that a notable event (such as a near miss) just occurred. At the time the event trigger 30 is activated, the wearable device 12 records and/or transmits and/or saves a higher level or high-density of environmental information such as sound, temperature, humidity, light, air quality, CO levels, position, acceleration and the like and transmits this information to database 60. This high-density environmental information is stored along with an audible message provided by the worker 16 explaining why they engaged the event trigger 30. In one or more arrangements, the wearable device 12 continually tracks and stores a predetermined amount of high-density data, such as sixty-seconds two minutes, thirty seconds, or the like. This high-density data is tracked and stored in a rolling manner. That is, the high-density data is overwritten or converted to low-density data unless an event occurs that causes the wearable device 12 to save and transmit the high-density data.

As one example, when event trigger 30 is activated, the wearable device 12 stores this high-density information for transmission when wearable device 12 is connected to charging base 18, or the wearable device 12 transmits this information wirelessly over the air when wireless connectivity is established with charging base 18 and/or monitoring system 14. When event trigger 30 is not activated, wearable device 12 stores and/or transmits a lower level or low-density of information, or overwrites a portion of the high-density information. That is, by way of example, high-density information may include storing and/or transmitting a sample from sensors 22 once every hundredth of a second or tenth of a second, whereas low-density information may include storing and transmitting a sample from sensors once every second or once every two seconds, or the like. In this way, a balance can be had between recording a high density information at and just prior to the time an accident, near miss or notable event occurs, while recording enough information to develop patterns and predict potential accidents while not being overly encumbered by too much data when an accident, near miss or notable event situation has not occurred.

In one or more arrangements, when event trigger 30 is activated, the sound sensor 22H, or microphone, is activated for a predetermined time or period thereafter. This allows the worker 16 to vocally describe the events of the accident, near miss or notable event contemporaneously, or just after, the event occurs in an audio recording. This allows for an honest and relatively unbiased account of the event shortly after the near miss occurs. Voice in this audio recording can be converted into text and automatically inserted into an event report, or alternatively the audio recording itself may be inserted directly into an event report. In one or more arrangements, the audio recording through sound sensor 22H occurs for a predetermined amount of time such as for thirty seconds or a minute after the event trigger 30 is pressed. In another arrangement, the audio recording through sound sensor 22H occurs for so long as the wearable device 12 detects that the worker 16 is talking. In another arrangement, the audio recording through sound sensor 22H occurs for so long as the worker 16 depresses or engages the event trigger 30. In another arrangement, sound sensor 22 records the audio for a length of time or period determined by any other manner, method or means.

In one or more arrangements, to eliminate or reduce unintentional engagement of the audio recording function of wearable device 12, wearable device 12 is configured to require a special engagement or unlock procedure to start the audio recording function. In one or more arrangements, a double engagement or double press of event trigger 30 is required to engage the audio recording function. In another arrangement, an elongated press of event trigger 30 is required to engage the audio recording function.

Event Triggers Based on Detection of Events

Additionally or alternatively, in one or more arrangements, an event trigger may be automatically engaged when data captured by sensors 22 satisfying a set of criteria. For example, in one or more arrangements, electronic circuit 24 of wearable device 12 is configured to continuously monitor data captured by sensors 22 of wearable device 12 of a worker 16 during a work shift and evaluate the data to identify instances in which the data indicates a particular event of interest (e.g., motion data indicating acceleration/deceleration exceeding a threshold).

In one or more arrangements, in response to identifying an event of interest, an event trigger is engaged which prompts wearable device 12 to record audio and selects a window of sensor data to communicate to monitoring system 14 (e.g., to kickoff a workflow and/or trigger performance of one or more actions). However, the arrangements are not so limited. Rather, in some various arrangements, wearable device 12 may be configured to perform various actions in response to engagement of an event trigger. Such actions may include but are not limited to for example, recording of an audio recording, communication of a segment (or window) of the sensor data in which the event occurred, and/or triggering one or more other actions by wearable device. Said another way, in some arrangements, wearable device 12 pre-evaluates sensor data so as to detect events of interest and engage an event trigger (or perform other action) in response to detecting the event of interest.

Pre-evaluation of sensor data by the wearable device 12 to identify events of interest to automatically engage an event trigger may provide several benefits. For example, in one or more arrangements, power usage by wearable device 12 for communication of data may be reduced as less data is required to be transmitted to monitoring system 14. Furthermore, because less data is transmitted by wearable devices 12 more bandwidth is available for communication data and interference and collisions are reduced. Pre-evaluation of sensor data by the wearable device 12 also reduces processing and storage requirements of monitoring system 14.

Periodic Communication of Data:

Additionally or alternatively, in one or more arrangements wearable devices 12 periodically communicate the sensor data or data metrics derived therefrom to monitoring system 14 in absence of an event trigger 30. In some various arrangements, such communication of data may be performed, for example, every second, ten seconds, thirty seconds, minute, 5 minutes, or any other suitable duration of time. In some various arrangements, such communication may communicate sensor measurements and/or data metrics from a single point in time, or measurements and/or data metrics collected over a certain window of time.

Figure 1:
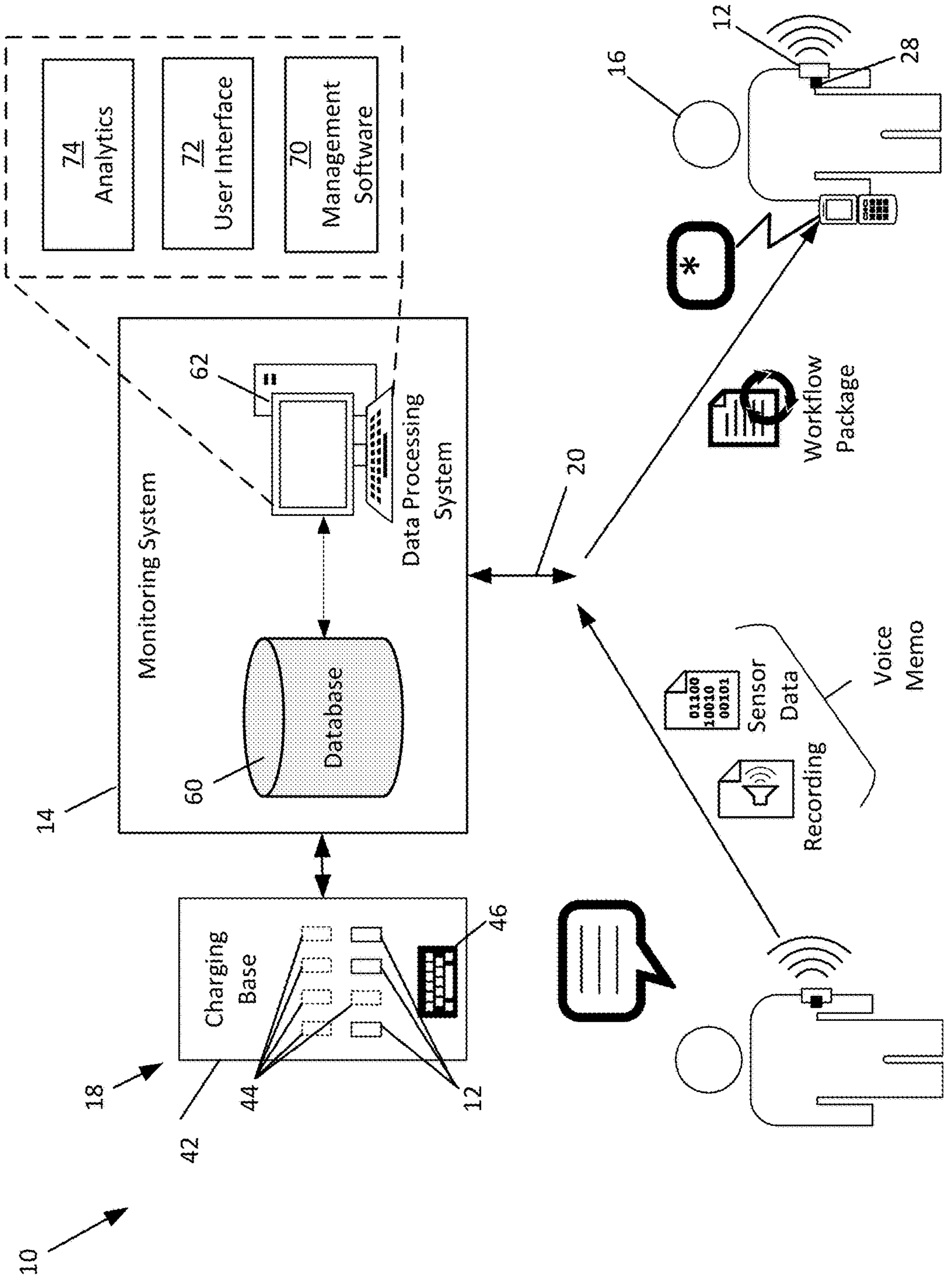
FIG. 1 shows a diagram of a system for collection of data indicative of worker activity, and/or health and safety risks via wearable devices, in accordance with one or more arrangements; the view showing wearable devices configured to communicate a voice memo containing an audio recording and sensor data to a monitoring system to indicate a workflow.
Figure 2:
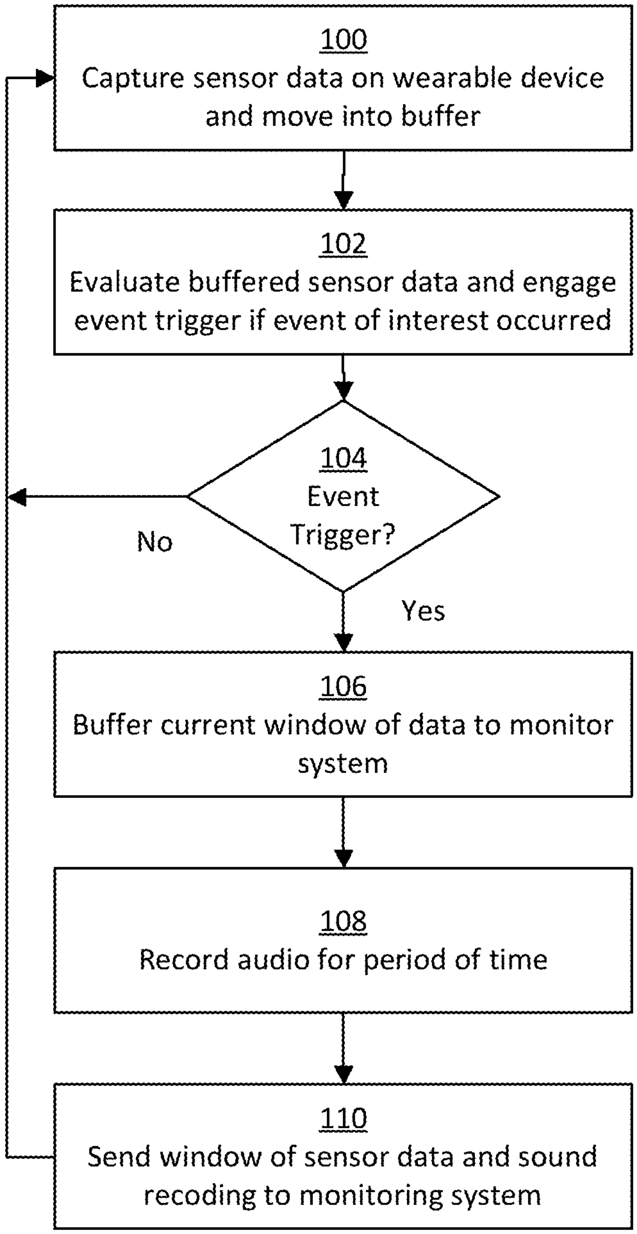
FIG. 2 shows a flowchart of an example process performed for collecting sensor data by a wearable device, in accordance with one or more arrangements; the process configured to communicate an audio recording and sensor data to a monitoring system in response to an event trigger.

Wearable Devices 12 in Operation:

FIG. 2 shows an example process performed for collecting and processing data by a wearable device 12, in accordance with one or more arrangements. In this example, wearable device 12 operates in a continuous loop to capture sensor data of a worker 16 during a work shift. In this illustrative example, motion data is captured and used to determine if an event of interest has occurred that should engage an event trigger. At process block 100, motion data is captured from one or more sensors 22 and placed in a buffer (or memory 36) storing a window of recent motion data (e.g., the most recent 10 seconds). At process block 102, the motion data is evaluated to determine if an event of interest occurred and event trigger should be engaged.

Different arrangements may utilize various different criteria and/or processes to identify events of interest. As one illustrative example, in one or more arrangements, events of interest are identified when acceleration in any direction exceeds a threshold. For instance, the magnitude of the acceleration vector is determined. Magnitude of the acceleration vector $\vec{a}$ may be determined by $$|\vec{a}|=\sqrt{x^2+y^2+z^2}$$

The determined magnitude of the acceleration vector may then be compared to a predetermined threshold. In this illustrative example, if the determined magnitude exceeds the threshold, an event of interest is detected. Otherwise, an event of interest is not detected. In one or more arrangements, a threshold acceleration of 2 g (19.6133 m/sec$^2$) is used to identify when motion data indicates an event of interest has occurred.

However, the embodiments are not so limited. Rather, other thresholds or types of sensor data may be utilized for identifying events of interest depending on the type of events to be detected. For example, in one or more arrangements, wearable devices 12 may be configured to process data acquired from motion and/or other sensors and/or data metrics derived therefrom, for example, using classifiers and/or other analytics processes to identify various events of interest. Such events of interest may include but are not limited to, for example, worker 16 speaking a wake word or phrase, worker 16 pressing a button, acceleration exceeding threshold, repetitive motions, excessive noise, adverse temperatures, or other working conditions, worker 16 being in close proximity to dangerous equipment, predictive accidents or near misses and/or any other notable event that may be pertinent to worker 16 safety and/or management. If an event of interest is detected at process block 102, event trigger 30 is automatically engaged.

If an event trigger is not engaged at decision block 104, the process returns to process block 100, where motion data is retrieved from one or more sensors 22 and moved into the buffer and the analyzed at process block 102 as previously described. If an event trigger 30 is engaged (manually or in response to detecting an event of interest) the process proceeds from decision block 104 to process block 106, where the current window of motion data is buffered in preparation for communication to monitor system 14. In one or more arrangements, the window of motion data includes 15 seconds of motion data centered on the motion data sample in which the event of interest was detected. In other words, the window of motion data includes approximately 7.5 seconds of motion data preceding the event trigger and 7.5 seconds of motion data following the event trigger. The motion data preceding and following the event trigger may help facilitate further analytics of the motion data. However, the embodiments are not so limited. Rather, it is contemplated that in some various arrangements, wearable device (s) 12 may be configured to use windows of various different lengths of time and/or time period relative to detected events of interest.

In this example arrangement, at block 108, sound is recorded for a period of time following the event trigger. At process block 110, the window of sensor data and the audio recording are communicated to monitoring system 14. After communicating the data and audio recording at process block 110, the process returns to process block 100, where motion data is retrieved from one or more sensors 22 and moved into the buffer and the process is repeated. The process repeats in this manner until wearable device 12 is checked-in, powered off, or operation is otherwise disabled.

In one or more arrangements, wearable devices 12 are configured to sample data from sensors at approximately 25. However, the embodiments are not so limited. Rather, it is contemplated that wearable devices 12 may sample data from sensors 22 at any frequency as may be appropriate for the type of data.

Although some arrangements are primarily described with reference to communication of certain types of sensor data (e.g., motion data), the embodiments are not so limited. Rather, it is contemplated that wearable devices 12 may communicate data of various other types of sensors in the windows of data in addition to or in lieu of motion data. For example, in one or more arrangements, wearable devices 12 may be configured to communicate data from all sensors 22 in the window of sensor data that is communicated to the monitoring system 14. Data from all sensors may be useful, for example, to facilitate analytics by monitoring system 14 or aid in performance of certain workflows created in response to receipt of a voice memo by monitoring system 14.

It is noted that in some arrangements, wearable devices 12 need not communicate a separate window of sensor data or audio recording for every sample that satisfies criteria for an event trigger. For example, in one or more arrangements, wearable devices 12 may be configured to disable communication of data windows and/or audio recordings for the same events of interest for a period of after communicating a first window of sensor data for a detected event trigger (e.g., for 1 minute). However, the embodiments are not so limited. Rather, it is contemplated that wearable devices 12 may be configured to disable communication of data windows and/or audio recordings for any other length of time after communicating a first window of sensor data for a detected event trigger.

In the arrangement shown in FIG. 2, data and/or recordings are communicated by wearable devices 12 to monitoring system 14 as events of interest are identified. However, the embodiments are not so limited. Rather, it is contemplated that in one or more arrangements, wearable devices 12 may store windows of sensor data and/or audio recordings corresponding to identified events of interest for later communication to monitoring system 14 (e.g., when wearable devices 12 are returned to charging base 18). For example, in one or more arrangements, wearable devices 12 may store a window of sensor data and/or an audio recording for later communication to monitoring system 14 if an attempt to wirelessly communicate the window of sensor data is unsuccessful for later communication to monitoring system 14.

Prioritized Communication of Data and/or Audio Recordings

In one or more arrangements, wearable devices 12 may be configured to communicate higher priority data and/or audio recording to monitoring system 14 promptly when event trigger 30 is engaged and store a lower priority data and/or audio recordings for later communication to monitoring system 14 (e.g., when docked in charging base 18). In some various arrangements, priority may be determined based on a number of different factors and/or criteria including but not limited to, for example, manual event trigger indicative of higher priority (e.g., user pressing a specific button and/or button press pattern dedicated for higher priority), whether an event of interest caused event trigger to be engaged, a type of event of interest that was detected (e.g., trip/fall detected), audio recording including a keyword associated with higher priority (e.g., emergency, medical, accident, etc), voice stress analysis of the audio recording, trained classifiers, or any other factor and/or criteria indicative of higher priority events.

As one illustrative example, in one or more arrangements, a high priority event (e.g., an accident or near miss or other safety matter) can be distinguished from a low priority event (such as a suggestion for improvement of a process or the factory layout by a worker 16) by the manner in which the event trigger 30 engaged. For instance, a high priority safety event may be reported by pressing the event trigger 30 twice and a low priority event that is not related to immediate safety concerns may be reported by pressing the event trigger 30 three times. Alternatively, two different triggers 36, such as two buttons, can be provided one dedicated for high priority issues the other dedicated for low priority issues. Additionally or alternatively, any other manner of reporting high priority and low priority issues may be used. By separating the reporting of high priority and low priority issues, reports of safety issues, accidents and near misses to be expedited through the system 10, such as immediately emailing or texting them to a safety manager or other manager so that they can respond quickly to safety issues while allowing non-safety issues to be handled as a lower priority.

In one or more arrangements, the report of safety issues is instantaneously reported over the air to charging base 18 and/or database 60 and is thereafter contemporaneously, immediately, and/or quickly sent to a safety manager's phone, email, text message or the like for their immediate attention. In contrast, non-safety related matters are stored on wearable device 12 and downloaded once wearable device 12 is docked in charging base 18. In this way, the system 10 includes an expedited path for the report of notable events that are safety issues and the system 10 includes a non-expedited path for the report of notable events that are not safety issues.

Figure 3:
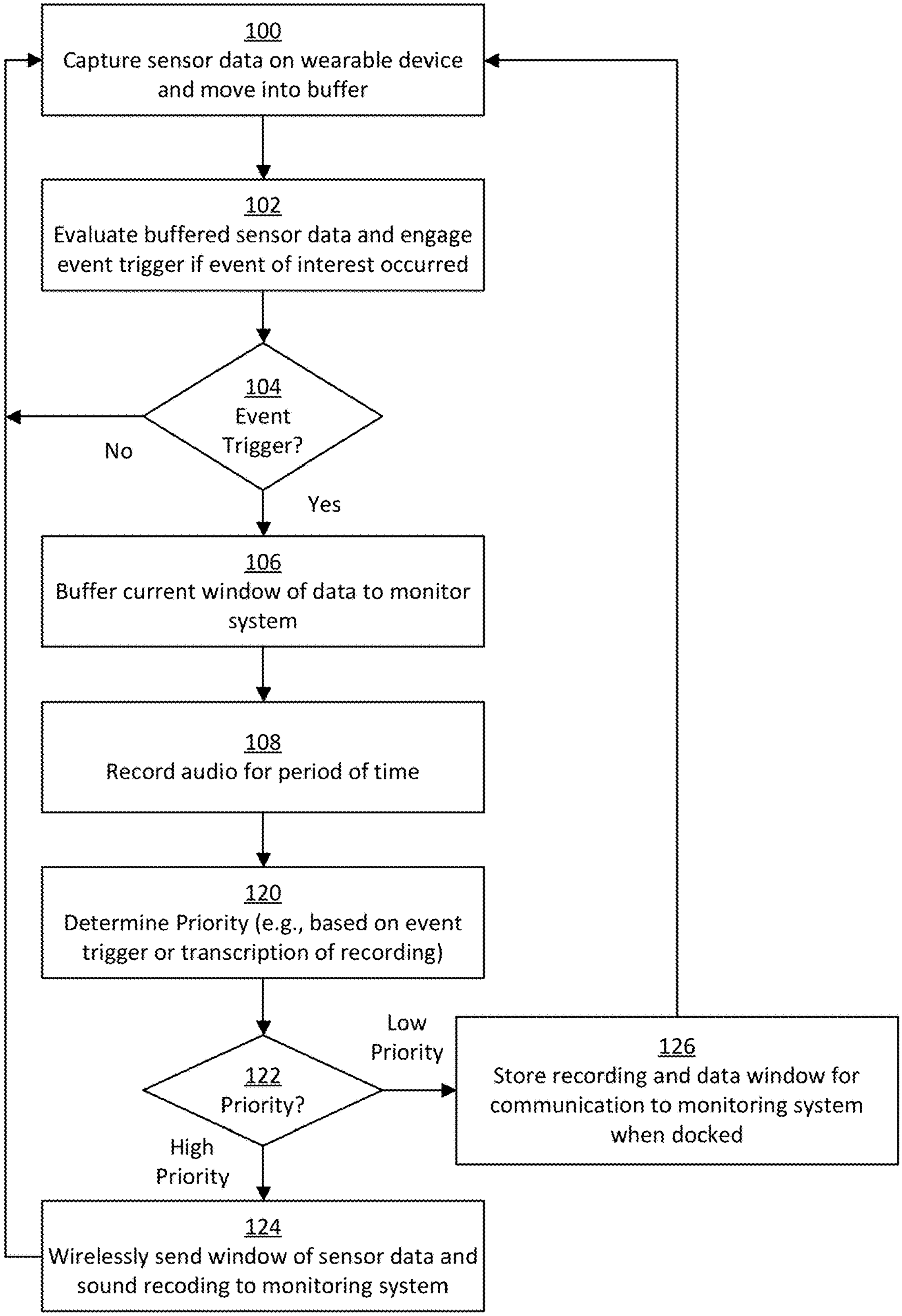
FIG. 3 shows a flowchart of an example process performed for collecting sensor data by a wearable device, in accordance with one or more arrangements; the process configured to communicate an audio recording and sensor data to a monitoring system in response to an event trigger.
Figure 4:
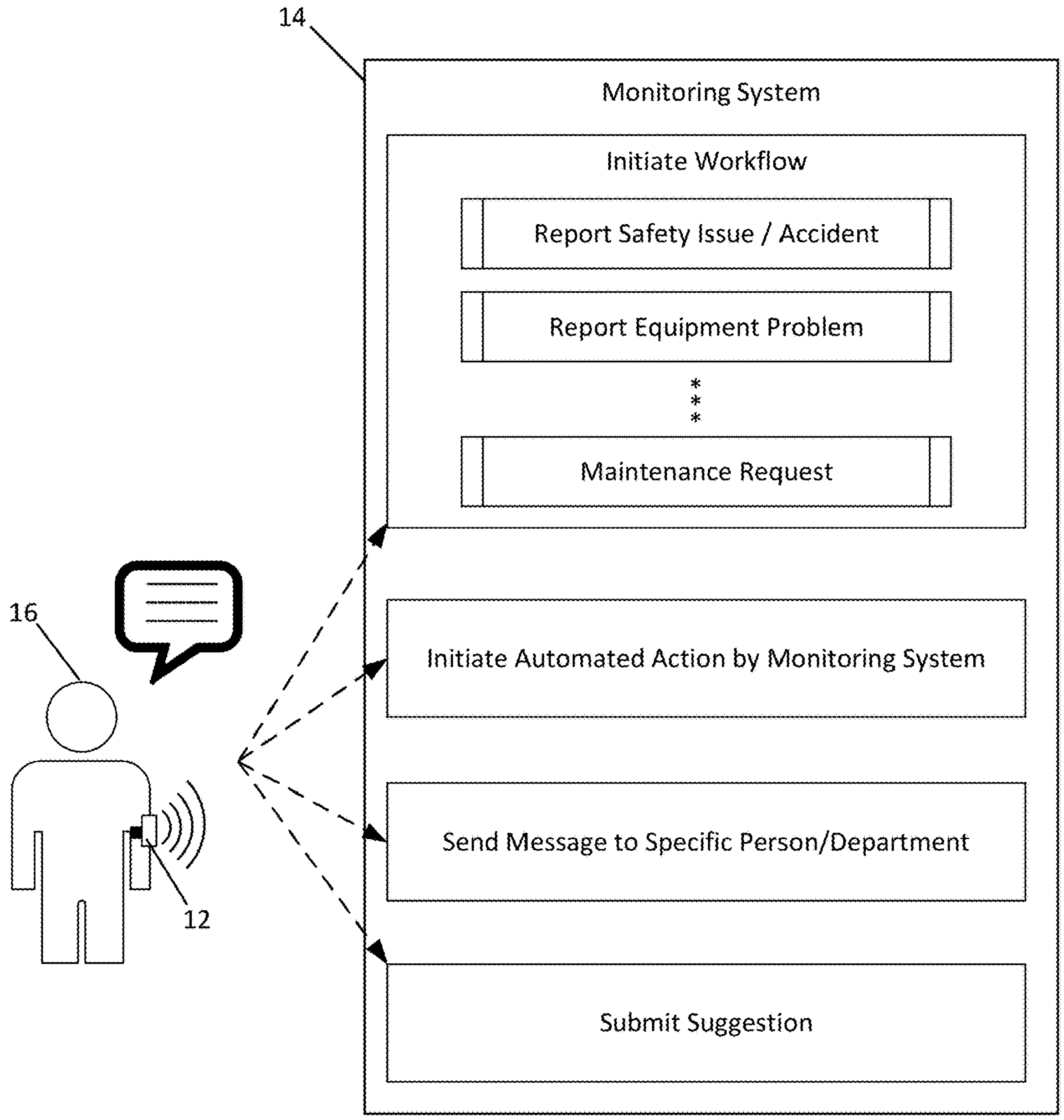
FIG. 4 shows a diagram of a system for collection of data indicative of worker activity, and/or health and safety risks via wearable devices, in accordance with one or more arrangements; the view showing some example processes that may be initiated by a monitoring system in response to receipt of a voice memo containing an audio recording and sensor data.

FIG. 3 shows an example process performed for collecting and processing data by a wearable device 12, in which higher priority data is communicated to monitoring system 14 immediately and lower priority data is stored for later communication. In this example, sensor data is captured and analyzed for events of interest at process blocks 100 and 102 as described with reference to FIG. 2. As further described, in response to an event trigger being engaged at decision block 104, a current window of data is buffered at process block 106 and audio is recorded for a period of time at process block 108.

In this example, after recording audio at process block 108, priority of the data (e.g., sensor data and/or recording) is determined at process block 120. If data is determined to be higher priority, the process proceeds from decision block 122 to process block 124, where the window of sensor data and the audio recording are communicated to monitoring system 14. After communicating the data and audio recording at process block 110, the process returns to process block 100, where motion data is retrieved from one or more sensors 22 and moved into the buffer and the process is repeated. If data is determined to be lower priority, the process proceeds from decision block 122 to process block 126, where the window of sensor data and the audio recording are stored for later communication to monitoring system 14. After communicating the data and audio recording at process block 110, the process returns to process block 100, where motion data is retrieved from one or more sensors 22, moved into the buffer, and the process is repeated. The process repeats in this manner until wearable device 12 is checked-in, powered off, or operation is otherwise disabled.

In one or more arrangements, when wearable device 12 is checked in process block 100, charging base 18 retrieves lower priority data stored on wearable device 12 (if any) and communicates such lower priority data to monitoring system 14.

While the above example is described with reference to two categories of events (high priority and lower priority), the arrangements are not so limited. Rather, it is contemplated that in some various arrangements wearable devices may be configured to determine or permit workers to specify any number of different categories and/or priorities of events to aid with later review and/or processing.

Automated Performance of Actions by Wearable Devices 12:

In one or more arrangements, wearable devices 12 are configured to perform analytics on sensor data directly on the wearable devices 12 to identify events of interest, generate data metrics, and/or trigger performance of various actions by wearable devices 12. In some various arrangements, actions may include but are not limited to, providing status messages, alerts, or other notification (e.g., emails, SMS, push notifications, automated phone call, social media messaging, and/or any other type of messaging) to a safety manager or other users and/or devices (e.g., computer, table, or smartphone).

In one or more arrangements, wearable devices 12 are configured to perform various preprogrammed actions in response to analytics of sensor data and/or derived data metrics satisfying one or more trigger conditions (e.g., detecting certain events of interest). In one or more arrangements, wearable devices 12 include a configuration data file in memory 36 that specifies one or more trigger condition and one or more actions to be performed when respective trigger conditions are satisfied. The configuration data file may be any form of information that indicates conditions in which wearable device 12 is to perform actions and which actions are to be performed. In one or more arrangements, configuration data file is arranged as a set of rules, where each rule indicates a set of conditions and one or more actions to be performed when the conditions are satisfied. However, it is contemplated that wearable devices 12 may be configured to utilize a configuration data file with any configuration, arrangement, format, or structure, Charging Base 18:

In one or more arrangements, system 10 includes a charging base 18. Charging base 18 is formed of any suitable size, shape, and design and is configured to receive, charge and transfer information from and to wearable devices 12. In the arrangement shown, as one example, charging base 18 includes a back wall 42 that includes a plurality of sockets 44 therein that are sized and shaped to receive wearable devices 12 therein. When wearable devices 12 are placed within sockets 44, wearable devices 12 are charged by charging base 18 and data may be transferred between wearable device 12 and charging base 18 and the other components of the system 10. Charging base 18 also includes a user interface 46 configured to provide the ability for the workers 16 to interact with the charging base 18. User interface 46 may include but is not limited to, for example, a plurality of sensors, a keypad, a biometric scanner, a touch screen or any other means or method input for information.

In one or more arrangements, charging base 18 is configured to facilitate checkout/checking of wearable devices 12 by workers 16. As one example, at the beginning of a shift, a worker 16 engages the charging base 18 using user interface to identify the worker with the system 10 (e.g., by biometrically scanning in with a finger or thumb print, a retinal scan, facial recognition, voice recognition, inputting a name or identifier, swiping an ID card, and/or any other manner or method of associating their personal identification with the system 10).

Upon receiving this information, charging base 18 and system 10 identifies the worker 16 and allocates a wearable device 12 held within one of the sockets 44 of the charging base 18 that is fully charged, or has the highest charge among the wearable devices 12, and assigns that wearable device 12 to that worker 16 by illuminating the wearable device 12, illuminating the socket 44 that the wearable device 12 is held in, or providing the socket number to the worker 16 or by identifying which wearable device 12 the worker 16 is to take by any other manner, method or means. Once the proper wearable device 12 has been identified to the worker 16, the worker 16 retrieves that wearable device 12 from the charging base 18 and puts on the wearable device 12.

During the work shift, the wearable device 12 gathers data from sensors 22 and communicates data and/or voice recordings to monitoring system 14 as described herein. At the end of the shift, the worker 16 returns the wearable device 12 to the charging base 18. Once the wearable device 12 is plugged into a socket 44, the charging base 18 begins charging the wearable device 12. If the wearable device 12 has buffered data, charging base 18 retrieves the data from the wearable device 12 and provides the retrieved data to monitoring system 14.

In one or more arrangements, after turning in the wearable device 12 at the end of their shift, the worker 16 is provided with a log of all instances that were identified as events of interest. The information related to each of these potential accidents or near misses and/or notable events is provided to the worker 16 such as time, acceleration, position, temperature, light level, air quality, volume, CO level, the audible recording or converted text of the contemporaneous recording of the incident or notable event. The worker 16 is then provided the opportunity to confirm or deny whether a notable event trigger actually occurred and provide additional information regarding the notable event trigger. This provides the worker 16 the opportunity to clarify the record and provide additional information.

In one or more arrangements, the system 10 may also update the software or firmware on the wearable device 12 and prepare the wearable device 12 for another use while in the charging base. For example, in one or more arrangements, system 10 may from time to time update classifiers or other analytics algorithms used by wearable devices 12 to identify events of interest.

Monitoring System 14:

Monitoring system 14 is formed of any suitable size, shape, design and is configured to receive and process sensor data from wearable devices 12 to facilitate analysis of sensor data (e.g., to assess worker physicality, risk, and/or derive various other data metrics). In the arrangement shown, as one example, monitoring system 14 includes a database 60 and a data processing system 62, among other components.

Database 60:

Database 60 is formed of any suitable size, shape, design and is configured to facilitate storage and retrieval of data. In the arrangement shown, as one example, database 60 is local data storage connected to data processing system 62 (e.g., via a data bus or electronic network 20). However, embodiments are not so limited. Rather, it is contemplated that in one or more arrangements, database 60 may be remote storage or cloud based service communicatively connected to data processing system 62 via one or more external communication networks.

In some various arrangements, information recorded by wearable devices 12 may be communicated to database 60 for storage directly (e.g., over electronic network 20) from wearable devices. Additionally or alternatively, in some various arrangements, information recorded by wearable devices 12 may be communicated to database 60 for storage indirectly (e.g., by charging base 18 and/or data processing system 62).

Data Processing System 62:

Data processing system 62 is formed of any suitable size, shape, and design and is configured to facilitate receipt, storage, and/or retrieval of information in database 60, execution of analytics processes 74, providing of a user interface 72, and/or implementation of various other modules, processes or software of system 10. In one or more arrangements, for example, such data processing system 62 includes a circuit specifically configured and arranged to carry out one or more of these or related operations/activities. For example, data processing system 62 may include discrete logic circuits or programmable logic circuits configured and arranged for implementing these operations/activities, as shown in the figures, and/or described in the specification. In certain embodiments, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions, which may be executed by a computer (or other electronic device) to perform these operations/activities.

Management Software 70:

In one or more arrangements, monitoring system 14 includes management software 70 configured to process audio recording, sensor data, and/or other information provided by wearable devices 12. In one or more arrangements, monitoring system 14 is configured to receive voice memos (that includes an audio recording and a window of sensor data) created by wearable device 12 in response to event trigger 30 being engaged. In some various arrangements, monitoring system 14 is configured to perform various actions in response to receiving a voice memo (or other data), which may include but are not limited to, for example, initiating a workflow, initiating automated action by monitoring system 14, sending a message/report to a specific person or department, submission of a suggestion, performing analytics processes, or any other action that may be initiated and/or performed by monitoring system 14.

FIG. 5 shows an example process that may be used to process voice memos received by monitoring system 14, in accordance with one or more arrangements. In this example arrangement, the audio recording of the voice memo is transcribed at process block 140. At process block 142, the voice memo is classified to determine what action to take. Some different arrangements may utilize various methods and/or means to classify voice memos. In some arrangements, the transcription and/or audio recording may be manually reviewed by a person to determine which action to take (e.g., create workflow, perform action, generate report, send message, etc). Additionally or alternatively, in some arrangements, some voice memos may be classified via automated analysis of the voice memo (e.g., using trained classifiers or other artificial intelligence). For example, in one or more arrangements, keywords in or linguistic analysis of the transcription may be used to categorize voice memos and initiate actions. As another example, in some arrangements, sensor data may be evaluated to identify occurrence of particular events (e.g., trip or fall) that are relevant to classification. In some arrangements, some voice memos may be classified using automated processes while other voice memos (e.g., that cannot be classified or may be emergencies) are referred to personal for immediate review and classification. However, the arrangements are not limited to these examples. Rather, it is contemplated that various different arrangements may utilize any method or means for classifying voice memos and/or initiate actions in response to voice memos.

At process block 144, a report, message, or workflow package is created based on the classification performed at process block 142. In this example arrangement, the audio recording is attached to the created report/message/workflow at process block 146 to facilitate review by the recipient. Additionally or alternatively, in some arrangements, the transcription of the audio recording may be attached to the created report/message/workflow.

In this example arrangement, sensor data may additionally or alternatively be attached to report/message/workflow at process block 148 if applicable to the determined classification of the voice memo. For example, sensor data from a wearable device 12 may be relevant to determining of the cause of a reported accident. Conversely, sensor data may not be relevant to a voice memo for a maintenance request. In this example, the created report/message/workflow is routed to the recipient/responsible party at block 150.

Initiate Workflow

In one or more arrangements, voice memos (or other data) received from wearable devices 12 can be used to initiate a workflow for performance of a particular operation. As some illustrative examples, in some various different arrangements, workflows may be used to initiate and track various operations including but not limited to, emergency/medical response to accidents, review of incidents, review of reported safety issues, repair requests, maintenance requests, equipment/supply orders or any other task that may be required in a workplace.

In one or more arrangements, management software 70 of monitoring system is configured to maintain workflow related data in database 60 and provide user interfaces to facilitate creation, tracking, and processing workflows. In one or more arrangements, management software 70 may associate and maintain various different data metrics and information for a created workflow. As some illustrative examples, in some different arrangements, such data metrics and information may include but are not limited to: name and/or identifier for the workflow, description of the task to be performed, person(s) assigned to perform the task, date workflow created, date assigned, date due, date completed, workflow status, record of actions taken in furtherance of the workflow, notes and/or messages pertaining to the workflow, documents, attachments, and/or any other information relevant to the management and/or performance of the workflow.

As discussed with reference to FIG. 5, in some arrangements, when a workflow is automatically or manually created for a received voice memo, the audio recording and/or data of the received voice memo may be attached or linked to the workflow. Additionally or alternatively, various other information and/or attachments relevant to the particular task may be added or linked to the workflow. Such information and attachments may include but are not limited to, for example, photographs, audio recordings, video, documents, repair manuals, or any other information or attachment that may be pertinent to a particular workflow. However, the arrangements are not so limited. Rather, it is contemplated that in some various arrangements, the user interfaces may be configured to permit workers to upload or link to additional information or attachments relevant to the task to be performed when a workflow is created or is in progress.

In one or more arrangements, management software 70 helps to manage and coordinate performance of workflow tasks by mangers and/or workers assigned to the workflow. For example, in one or more arrangements, management software 70 is configured to allow persons to be added to a workflow in various different roles (e.g., requestor, manager, assigned worker, workflow lead, or any other role). In some arrangements, management software 70 is configured to notify persons when they are added to the workflow and/or when the workflow is updated. In some arrangements, management software 70 permits users to customize when and how they received such notifications. In some arrangements, management software 70 permits users to send messages to other individuals or all persons that are added to a workflow (e.g., to coordinate performance of a task or ask questions).

In one or more arrangements, management software 70 helps track status of workflow tasks/milestones and completions deadlines. In some arrangements, management software 70 may be configured to automatically provide reminder notifications as deadlines approach. As some limited examples, reminder notification might specify that a pending task is due in 1 month or due in 1 week. However, the arrangements are not so limited. Rather, is it contemplated that in various arrangements, management software 70 may be configured to use any time schedule to provide status and/or reminder notifications.

Report Generation and Messaging

In some arrangements, workers 16 may use voice memos to initiate automated report creation and/or communication of messages by monitoring system 14. For example, a worker 16 may create a voice memo specifying to send a message to or report and incident or issue to a particular person and/or department. For example, in one or more arrangements, after a voice memo is classified as reporting an incident, management software 70 may convert the information in a voice memo into an incident report and a notification, such as a text message, email, or the like is transmitted to an electronic device (such as a cell phone, a handheld device, their own wearable device 12, an email account, or any other electronic device capable of receiving an electronic message or information) of one or more safety managers or other managers or other persons in charge of managing safety in the manufacturing facility. In one or more arrangements, the notification includes a link to the generated report and the position/location of the event, time of the event, name of the worker 16 involved and type of potential accident or near miss along with any other pertinent information. In one or more arrangements, the audio recording in the received voice memo is also transmitted, or this audible recitation is automatically converted to text which is transmitted in text form as part of the generated incident report or notification. With this timely information, the safety manager can quickly and effectively respond to the potential accident or near miss. This information is also stored as part of the incident report in database 60 for risk assessment, data mining, data retrieval, data analytics, and/or machine learning and artificial intelligence purposes.

As this event is a safety event, transmission is expedited through the system 10 so that the safety manager, a response team or others can quickly respond in an attempt to mitigate the injury or damage. In one or more arrangements, when this signal indicating a safety event occurred is received, the location of the event is transmitted to a building control or safety system that then implements alarms, flashing lights or other safety precautions in the affected portion of the manufacturing facility to alert others as to the event and in an attempt to prevent further injury or damage. Once the safety manager arrives at the scene of the accident or near miss, they may see that a pallet was placed in a high traffic area, as one example. In response, the safety manager can move the pallet or cordon off the area to prevent future accidents and/or take further corrective actions.

Suggestions

In some arrangements, workers 16 may use voice memos to submit suggestions (e.g., to improve safety or efficiency) for consideration by management. Providing an easy method to submit suggestions may encourage workers 16 to submit suggestions during a work shift when the idea is fresh in their mind. For example, in one or more arrangements, after a voice memo is classified as a suggestion, management software 70 may convert the information in a voice memo into a suggestion document and place the suggestion document in a queue for later review by management. In various implementations, suggestion document may have various different formats and/or include various information relevant to evaluation of the suggestion. For example, in some arrangements, a suggestion document may include but is not limited to, for example, the audio recording of the voice memo, a transcription of the recording, and a location where the voice memo was created, date and time of the voice recording, and/or any other data that may be relevant to evaluation of suggestions.

Trigger Actions Based Data Gathered by Wearable Devices 12:

In one or more arrangements, management software 70 (and/or analytic processes 74) may be configured to perform various actions in response to voice memos and/or data provided by wearable devices satisfying certain criteria. For example, in one or more arrangements, monitoring system 14 may be configured to generate control signals and/or control various equipment or switching of one or more relay switches (not shown) in response to voice memos or other data received from a wearable device 12 satisfying a particular set of criteria. For example, in one or more arrangements, management software 70 may be configured to control operation of various devices (e.g., lights, alarms, locks, doors, and/or any other devices) in response to the audio recording of the voice memo identifying the device and specifying command keyword directing the action to be performed (e.g., turn on, turn off, open, close, etc.).

User Interface 72,

User interface 72 is formed of any suitable size, shape, design, technology, and in any arrangement and is configured to facilitate user control and/or adjustment of various components of system 10. In one or more arrangements, as one example, user interface 72 includes a set of inputs (not shown), Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 72 includes a display (not shown). Display is formed of any suitable size, shape, design, technology, and in any arrangement and is configured to display information of settings, sensor readings, time elapsed, and/or other information pertaining to worker activity and/or health and safety risks, operation of system 10, and/or management of workers 16. In one or more arrangements, the display may include, for example, LED lights, meters, gauges, screen or monitor of a computing device, tablet, and/or smartphone.

Additionally, or alternatively, in one or more arrangements, the inputs and/or display nay be implemented on a separate device that is communicatively connected to monitoring system 14. For example, in one or more arrangements, operation of monitoring system 14 may be customized or controlled using a smartphone or other computing device that is communicatively connected to the monitoring system 14 (e.g., via Bluetooth, WIFI, and/or the internet). In one or more arrangements, monitoring system 14 may provide one or more user interfaces 72 to facilitate creation, review, management, and/or otherwise processing of workflows.

FIGS. 6-7 show screen shots of some example user interfaces for to facilitate creation, review, managing, and/or otherwise processing of workflows, in accordance with one or more arrangements. In this illustrative example, FIG. 6 shows an example dashboard style user interface 72 to facilitate creation, review, and processing of pending workflows. In this example arrangement, the user interface 72 utilizes workflow tiles to provide high level description recent workflows or workflows matching particular search criteria. In this example arrangement, the workflow tiles indicate a title, the date created, the location, the person(s) assigned to the workflow, and a status. In this example arrangement, workflow tiles also include buttons to review the audio recording and attachments to the workflow (if any).

In this example arrangement, the user interface 72 organizes workflows into 3 columns: Needs Attention, In Progress, and Completed. The Needs Attention column includes workflows that need review or additional information before the workflow can be forwarded to the assigned person(s). For instance, in one or more arrangements, management software 70 of monitoring system 14 is configured to automatically create a new workflow when a voice memo is received by monitoring system 14. In this illustrative example, such a new workflow is shown in the bottom of the Needs Attention column. In this instance, the workflow has not been reviewed to add additional information or assign to a person to perform the workflow. However, the arrangements are not so limited. Rather, it is contemplated that in one or more arrangements user interface 72 may permit a manager or other person to manually create a new workflow without the monitoring system 14 having received a new voice memo from a wearable device 12.

In this instance, when a workflow is ready to be initiated (e.g., forwarded to the assigned person), a manager or other party can simply drag and drop the workflow tile to the In Progress column. Similarly, to close out a workflow that has been completed, a user can simply drag and drop the workflow tile from the In Progress column to the Completed Column.

FIG. 7 shows an example user interface 72 to facilitate creation, review, and editing of a selected workflows (e.g., when created or while in progress). In one or more arrangements, a workflow may be selected, for example, by double clicking on a workflow tile in the interface shown in FIG. 6.

In this illustrative example, in addition to the information shown in the workflow tile, the user interface 72 provides a field for a short description of the task to be performed. In this illustrative example, the user interface 72 additionally provides a sub-interface to add comments and review previous comments and activity. In this illustrative example, the user interface 72 additionally provides a sub-interface to permit a user to adjust the status of the task (e.g., to specify the percentage completed). In this illustrative example, the user interface 72 additionally permits a user to add tags to the workflow to facilitate easy searching for the workflow. In this illustrative example, the user interface 72 additionally allows a user to add links to various items of interest such as the audio recording, a transcription of the audio recording, sensor data received with the audio recording, or any other relevant information.

In this illustrative example, the user interface 72 additionally allows a user to upload relevant attachments. In this illustrative example, a photograph and a QR code are attached to the workflow. For instance, a worker inspecting seals of a cooler may take and upload a picture showing condition of a seal. Similarly, the worker may scan and attach a QR code on the cooler or other equipment being inspected.

However, the arrangements are not limited to the example interfaces shown herein. Rather, it is contemplated that management software 70 may be configured to utilize any interfaces configuration displaying various additional or alternative types of information that may be relevant to workflows.

Analytics Processes 74:

In some example arrangements, data processing system 62 is configured to perform various tracking, analytics processes 74, and/or other operations to evaluate audio recordings and/or data received from wearable devices 12.

Physicality Assessment:

In one or more arrangements, analytics processes 74 are configured to analyze data provided by sensors 22 to assess the physical exertion of workers 16. Jobs requiring high levels of physical exertion may be more likely to result in injury or require more frequent rotation between assigned jobs. In this example arrangement, analytics processes 74 are configured to quantify the total physicality of tasks performed by workers 16 based on heart rate, temperature, perspiration level, number of steps, distance traveled, accelerometer data, and/or other data acquired by sensors 22 or determined by analytics processes 74 using data analytics (e.g., the determined repetitive motion quantification). In some various arrangements, the analytics processes 74 may generate and store data metrics indicating instances in which a worker 16 exhibits high levels of physical exertion during a work shift. Such data metrics may be useful in assessing safety risks faced by a worker 16 during a work shift, assessing worker 16 productivity, and/or determining work schedules.

Identifying High Risk Events:

In one or more arrangements, analytics processes 74 are configured to process information received from wearable devices 12 and/or data stored in database 60 to derive additional data metrics pertinent to assessment of safety risk of workers 16. In an example arrangement, analytics processes 74 may be configured to evaluate the data using a classifier, state machine, and/or other machine learning algorithm that is trained to identify high risk events (e.g., accidents, trips/falls, near misses, and/or other events indicative of injury or heightened safety risk) that are not directly identified and reported by wearable devices 12. In some arrangements, identified instances may be logged to create a history of high risk events for a worker 16. Such historical data may be useful in assessing safety risks faced by a worker 16 during a work shift.

Motion Identification and Assessment:

In yet another example arrangement, analytics processes 74 are configured to analyze data of an accelerometer sensor 22 to identify motions which may lead to injury over time. Identification of motions may be helpful to identify performance of tasks that have a higher risk of injury. Identification of such tasks may be useful in assessing safety risks faced by a worker 16 during a work shift. In one or more arrangements, analytics processes 74 may be configured to identify any number of different motions including but not limited to, for example, bending at waist, twisting, overhead reach, walking, slips, trips, falls, and/or repetitive motions.

Identification of repetitive motions may be helpful to facilitate development and execution of measures to avoid such injury. In this example arrangement, analytics processes 74 may be configured to regularly retrieve accelerometer sensor 22 data of workers 16 from database 60 for evaluation (e.g., daily, weekly, or monthly). After retrieving the data, analytics processes 74 processes the data using, for example a classifier, state machine or other machine learning algorithm that is trained to detect and group similar motion events.

In an example arrangement, after processing the data to identify similar motion events, analytics processes 74 determines a set of workers 16 in which a motion or similar group of motions is identified with a high number of occurrences (e.g., exceeding a specified threshold). In this example arrangement, analytics processes 74 then flag the task performed by the workers 16 as a high risk activity.

In one or more arrangements, analytics processes 74 are configured to quantify the level of repetitive motions performed by a worker 16. For example, in one or more arrangements, analytics processes 74 may be configured to quantify repetitive motions based on the number of instances that a worker 16 performs the identified repetitive motions in a certain period of time (e.g., day, week, month). In some various arrangements, the analytics processes 74 may generate reports, e.g., tables, charts, graphs, maps, showing the quantified repetitive motion, for example, for different jobs, workplace areas, different departments, groups and/or individual workers, and/or different shifts or times of day.

Deviation from Similar Workers

In one or more arrangements, analytics processes 74 are configured to identify workers 16 in which recorded information and/or data metrics deviates from that of other similarly situated workers. Such identification of workers 16 may be useful for example to identify workers 16 whose safety risk may be atypical and not accurately represented by the average risk for the worker's occupational role. In one or more arrangements, analytics processes 74 may generate a report indicating workers 16 for which deviations have been identified. In some arrangements, the analytics processes 74 may send the report to a manager for review. In some arrangements, in response to identifying deviations for a set of workers 16, monitoring system 14 may be configured to automatically perform various additional analytics processes 74 to generate data metrics indicative of safety risk faced by the workers 16.

Trend Analysis:

It is recognized that workers 16 tend to experience increased risk over time, often due to changes in their work environment and/or long hours in difficult conditions. As an illustrative example, a worker 16 may begin to regularly work in low lighting at the end of a long shift. Such low lighting may present risk of fatigue and increase risk of injury. In one or more arrangements, analytics processes 74 are configured to track values of the worker data stored in database 60 to identify when trends occur. In one example arrangement, in response to identifying a trend in the data, analytics processes 74 update data metrics and/or risk assessments for the worker 16. Additionally or alternatively, in response to identifying a trend in the data, analytics processes 74.

Machine Learning:

In one or more embodiments, data processing system 62 and/or other components of system 10 may be configured and arranged to monitor, learn, and modify one or more features, functions, and/or operations of the system. For instance, analytics processes 74 of data processing system 62 may be configured to monitor and/or analyze data stored in database 60 and/or operation of system 10. As one example, in one or more arrangements, data processing system 62 may be configured to analyze the data and learn, over time, data metrics indicative of safety risks and/or algorithms for identification of safety risks. Such learning may include, for example, generation and refinement of classifiers and/or state machines configured to map input data values to outcomes of interest or to operations to be performed by the system 10 (e.g., in response to voice memo). In various embodiments, analysis by the data processing system 62 may include various guided and/or unguided artificial intelligence and/or machine learning techniques including, but not limited to: neural networks, genetic algorithms, support vector machines, k-means, kernel regression, discriminant analysis and/or various combinations thereof. In different implementations, analysis may be performed locally, remotely, or a combination thereof.

In one or more arrangements, analytics processes 74 are configured to utilize voice memos created by workers 16 to select data for training of classifiers (or other machine learning algorithms). Such selection of data may be used, for example, to facilitate unsupervised training of machine learning algorithms to recognize certain patterns sensor data indicative of certain events. For example, after a voice memo is classified, sensor data provided in the voice memo may be used to train classifiers to identity patterns of sensor data indicative of that category of voice memo. The trained classifier may then be used to assist in automated classification of future voice memos.

From the above discussion, it will be appreciated that one or more arrangements provide a wearable device, system, and/or method of use presented improves upon the state of the art. Specifically, one or more arrangements provide a wearable device, system, and/or method: for collecting, reporting and analyzing information indicative of work performed by workers and/or conditions that workers are exposed to in a workplace to better assess physicality of workers and safety risk posed to workers during a work shift: that improves upon the state of the art; that collects information about the work performed by workers and workplace conditions; that records audio in response to an event trigger and communicates the audio recording to a monitoring system; the voice memo containing the audio recording and sensor data to a monitoring system; that uses voice memos to initiate workflows managed by a monitoring system; that uses voice memos to initiate one or more actions by a monitoring system; that uses voice memos to permit workers to report incidents; that uses voice memos to permit workers to send communications; that uses voice memos to permit workers to submit suggestions; that provides a user interface for users to create, manage, and process workflow tasks; that aggregates a great amount of information about the work performed by workers and workplace conditions and facilitate data analytics; that eliminates bias in the collection of information about the work performed by workers and workplace conditions; that eliminates the inconsistency in reporting information about the work performed by workers and workplace conditions; that utilizes collected information to assess safety risks faced during a work shift; that is cost effective; that is safe to use; that is easy to use; that is efficient to use; that is durable; that is robust; that can be used with a wide variety of manufacturing facilities; that is high quality; that has a long useful life; that can be used with a wide variety of occupations; that provides high quality data; and/or that provides data and information that can be relied upon. These and countless other objects, features, or advantages of the present disclosure will become apparent from the specification, figures, and claims.

What is claimed:

1. A system for monitoring worker activity, comprising:

a wearable device;

the wearable device configured to be worn by a worker during a work shift;

the wearable device having a plurality of sensors;

the plurality of sensors including a sound sensor;

the wearable device including an event trigger;

a data processing system;

wherein in response to the event trigger being engaged, the wearable device is configured to record an audio recording using the sound sensor and communicate a set of data including the audio recording to the data processing system;

wherein the data processing system is configured to facilitate creation of a workflow for performance of a task related to the audio recording in response to receiving the set of data.

2. The system of claim 1, wherein the data processing system includes software configured to automatically attach the audio recording to the workflow.

3. The system of claim 1, wherein the data processing system includes software configured to automatically create a transcription of the audio recording and attach the transcription to the workflow.

4. The system of claim 1, wherein the set of data includes data from two or more of the plurality of sensors.

5. The system of claim 1, wherein the wearable device is configured to record the audio recording for a predetermined length of time after the event trigger is engaged.

6. The system of claim 1, wherein the wearable device is configured to record the audio recording until the wearable device determines that the worker has stopped talking.

7. The system of claim 1, wherein the wearable device is configured to record the audio recording for a length of time while the event trigger is engaged by the worker.

8. The system of claim 1, wherein event trigger is a switch.

9. The system of claim 1, wherein event trigger is a button.

10. The system of claim 1, wherein the wearable device is configured to initiate an audio recording in response to data from one or more of the plurality of sensors satisfying a predetermined set of criteria.

11. The system of claim 1, wherein the wearable device has a mechanism for the worker to determine whether the set of data is for a higher priority matter or a lower priority matter.

12. The system of claim 1, wherein the wearable device has a mechanism for the worker to determine whether the set of data is for a higher priority matter or a lower priority matter;

wherein the wearable device is configured to communicate the set of data to the data processing system in response to determining the set of data is for a higher priority matter;

wherein the wearable device is configured to store the set of data for later communication to the data processing system in response to determining the set of data is for a lower priority matter.

13. The system of claim 1, wherein the wearable device has a mechanism for the worker to determine whether the set of data is for a higher priority matter or a lower priority matter;

wherein when the set of data is determined to be a higher priority matter, the wearable device is configured to communicate the set of data to the data processing system using a first protocol;

wherein when the set of data is determined to be a lower priority matter, the wearable device is configured to communicate the set of data to the data processing system using a second protocol;

wherein the first protocol has a higher urgency level than the second protocol.

14. The system of claim 1, wherein the wearable device is configured to determine whether the audio recording should be classified as a high priority matter or a low priority matter.

15. The system of claim 1, wherein the wearable device is configured to determine whether the audio recording should be classified as a high priority matter or a low priority matter;

wherein when the set of data is determined to be a high priority matter, the wearable device is configured to communicate the set of data to the data processing system using a first protocol;

wherein when the set of data is determined to be a low priority matter, the wearable device is configured to communicate the set of data to the data processing system using a second protocol;

wherein the first protocol has a higher urgency level than the second protocol.

16. A system for monitoring worker activity, comprising:

a wearable device;

the wearable device configured to be worn by a worker during a work shift;

the wearable device having a plurality of sensors;

the plurality of sensors including a sound sensor;

the wearable device including an event trigger;

a data processing system;

wherein in response to an event trigger being engaged, the wearable device is configured to record an audio recording using the sound sensor and communicate a set of data including the audio recording to the data processing system;

wherein in response to receiving the set of data, the data processing system is configured to create a transcription of the audio recording and evaluate the transcription to select one of a set of a plurality of actions to be performed based on the transcription;

wherein the data processing system is configured to automatically perform the selected one of the set of actions.

17. The system of claim 16, wherein the set of actions includes: creating a workflow for a task described in the audio recording, creating a report for an incident or issue described in the audio recording, and submitting a suggestion described in the audio recording.

18. The system of claim 16, wherein the wearable device is configured to record the audio recording for a predetermined length of time after the event trigger is engaged.

19. The system of claim 16, wherein the wearable device is configured to record the audio recording until the wearable device determines that the worker has stopped talking.

20. The system of claim 16, wherein the wearable device is configured to record the audio recording for a length of time while the event trigger is engaged by the worker.

21. The system of claim 16, wherein event trigger is a switch.

22. The system of claim 16, wherein event trigger is a button.

23. The system of claim 16, wherein the wearable device is configured to initiate an audio recording in response to data from one or more of the plurality of sensors satisfying a predetermined set of criteria.

24. The system of claim 16, wherein the wearable device has a mechanism for the worker to determine whether the set of data is for a higher priority matter or a lower priority matter.

25. The system of claim 16, wherein the wearable device has a mechanism for the worker to determine whether the set of data is for a higher priority matter or a lower priority matter;

wherein the wearable device is configured to communicate the set of data to the data processing system in response to determining the set of data is for a higher priority matter;

wherein the wearable device is configured to store the set of data for later communication to the data processing system in response to determining the set of data is for a lower priority matter.

26. The system of claim 16, wherein the wearable device has a mechanism for the worker to determine whether the set of data is for a higher priority matter or a lower priority matter;

wherein when the set of data is determined to be a higher priority matter, the wearable device is configured to communicate the set of data to the data processing system using a first protocol;

wherein when the set of data is determined to be a lower priority matter, the wearable device is configured to communicate the set of data to the data processing system using a second protocol;

wherein the first protocol has a higher urgency level than the second protocol.

27. The system of claim 16, wherein the wearable device is configured to determine whether the audio recording should be classified as a high priority matter or a low priority matter.

28. The system of claim 16, wherein the wearable device is configured to determine whether the audio recording should be classified as a high priority matter or a low priority matter;

wherein when the set of data is determined to be a high priority matter, the wearable device is configured to communicate the set of data to the data processing system using a first protocol;

wherein when the set of data is determined to be a low priority matter, the wearable device is configured to communicate the set of data to the data processing system using a second protocol;

wherein the first protocol has a higher urgency level than the second protocol.

29. A system for monitoring worker activity, comprising:

a wearable device;

the wearable device configured to be worn by a worker during a work shift;

the wearable device having a plurality of sensors;

the plurality of sensors including a sound sensor;

the wearable device including an event trigger;

a data processing system;

wherein in response to an event trigger being engaged, the wearable device is configured to record an audio recording using the sound sensor and communicate a set of data including the audio recording to the data processing system;

wherein in response to receiving the set of data the data processing system is configured to select one of a set of a plurality of actions to be performed based on the set of data;

wherein the data processing system is configured to automatically perform the selected one of the set of actions.

* * * * *